United States Patent
Nishioka et al.

(10) Patent No.: US 6,722,947 B2
(45) Date of Patent: Apr. 20, 2004

(54) LAPPING MACHINE, LAPPING METHOD, AND METHOD OF MANUFACTURING MAGNETIC HEAD

(75) Inventors: Teruaki Nishioka, Kawasaki (JP); Kazuo Yokoi, Kawasaki (JP); Yoshiaki Yanagida, Kawasaki (JP); Shunsuke Sone, Kawasaki (JP); Koji Sudo, Kawasaki (JP); Tomokazu Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 09/950,454

(22) Filed: Sep. 10, 2001

(65) Prior Publication Data

US 2002/0052172 A1 May 2, 2002

Related U.S. Application Data

(63) Continuation of application No. PCT/JP99/01418, filed on Mar. 19, 1999.

(51) Int. Cl.$^7$ ................................................ B24B 49/00
(52) U.S. Cl. ............................ 451/10; 451/11; 451/41; 451/78; 29/603.16
(58) Field of Search ................................ 451/28, 41, 9, 451/10, 11, 278; 360/320, 319, 234.6, 234.3; 29/603.11, 603.16, 603.01, 603.06, 603.09, 603.13

(56) References Cited

U.S. PATENT DOCUMENTS

| | | | | |
|---|---|---|---|---|
| 5,899,793 A | * | 5/1999 | Yanagida et al. | 451/8 |
| 6,375,539 B1 | * | 4/2002 | Sudo et al. | 451/5 |
| 6,532,646 B2 | * | 3/2003 | Watanuki | 29/603.12 |

FOREIGN PATENT DOCUMENTS

| | | |
|---|---|---|
| JP | 04-053672 | 2/1992 |
| JP | 05-225511 | 9/1993 |
| JP | 07-009328 | 1/1995 |
| JP | 10-286765 | 10/1998 |
| JP | 11-000863 | 1/1999 |

* cited by examiner

Primary Examiner—Eileen P. Morgan
(74) Attorney, Agent, or Firm—Greer, Burns & Crain, Ltd.

(57) ABSTRACT

A lapping machine comprises a lapping surface plate (1) rotated by a rotating mechanism, a lapping jig (28) having a plurality of projections to bottom surfaces of which a work (30) to be lapped by a lapping surface on the lapping surface plate (1) is fitted, amount-of-projection adjusting elements (29) for adjusting the variation of the plurality of projections (28c) to the lapping surface plate (1) individually, and a control circuit (36) for outputting variation-of-projection control signals to the variation-of-projection adjusting elements (29).

13 Claims, 25 Drawing Sheets

$S_2$ : RESISTANCE VALUE MEASURING SIGNAL
$S_3$ : AMOUNT-OF-PROJECTION-OF-PROJECTION ADJUSTING SIGNAL
$S_0$ : LAPPING-SURFACE-PLATE NUMBER-OF-REVOLUTION ADJUSTING SIGNAL
$S_1$ : AMOUNT-OF-PRESSURE ADJUSTING SIGNAL

50b OPERATION HOLES

① FIRST ORDER DIFFERENTIATION
② INITIAL SHAPE

③ ZERO-CROSSING POINT

① CORRECTION AMOUNT DISTRIBUTION
② FINAL SHAPE
③ INITIAL SHAPE

LAPPING MACHINE, LAPPING METHOD, AND METHOD OF MANUFACTURING MAGNETIC HEAD

This application is a continuation of PCT/JP01/01418 filed Mar. 19, 1999.

TECHNICAL FIELD

The present invention relates to a lapping machine, a lapping method and a magnetic head manufacturing method and, more particularly, a lapping machine and a lapping method capable of working a work with high precision, and a magnetic head manufacturing method using the lapping method.

BACKGROUND ART

In case the slider equipped with the magnetic head is formed, normally such slider is formed via the steps of forming a plurality of magnetic heads in a matrix fashion on a substantially disk-like substrate, then dividing the substrate into a plurality of pieces to form Bar-like (stripe-like) works, then shaping the works, and then dividing the works into chips every magnetic head. The chip-like substrate is employed as the slider.

In the steps of shaping the work, steps of forming a rail surface for the slider and lapping a part of the work are contained. The bar-like work is also called a "row bar" on which at least the magnetic heads are aligned.

The lapping of the work is carried out to adjust a height of a magneto-resistive layer constituting the magnetic head and a height of the gap layer. Since the precision in the order of submicron unit is required for the height of the magneto-resistive layer or the gap layer, capable of working the work with high precision is needed.

In case the magnetic head is lapped, the lapping machine as set forth in Patent Application Publication (KOKAI) Hei 10-286765, for example, is employed.

As shown in FIG. 1, in case the work is lapped by the lapping machine, the work 101 is fitted to a lower surface of a lapping jig 102 in the situation that a top end of the magnetic head (not shown) on the work 101 is directed downward, and then the lapping jig 102 is fitted to an adaptor 103. Then, top ends of the work 101 and the magnetic head are lapped by a lapping surface plate 104. The work 101 is pushed against the lapping surface plate 104 by a pressure machine 105 via the adaptor 103 and the lapping jig 102. In addition, because the camber is generated in many works 101, all the magnetic heads on the work 101 are seldom brought into contact with an upper surface of the lapping surface plate 104 under the same conditions. For this reason, a lower end of the lapping jig 102 is pushed against the lapping surface plate 104 by one or three bending arms 106 that are passed through an opening 102a provided in the center of the lapping jig 102, and then a distribution of the pushing force to the lapping surface plate 104 on work 101 is adjusted by changing the pushing force, whereby the camber of the work 101 with respect to the upper surface of the lapping surface plate 104 is corrected.

Meanwhile, as shown in FIG. 1, in order to correct the camber of the work 101 by using one or three bending arms 106, top end positions of a plurality of magnetic heads being aligned on the work 101 must be successively changed along the work 101, as shown in FIG. 2. In other words, in the case of the state as shown in FIG. 2, the use of the bending arm 106 makes it easy to uniformize the lapping of a plurality of magnetic heads on the work 101. If the lapping of the top ends of the magnetic heads is carried out uniformly, characteristics of the lapping heads become constant.

However, in case the top ends of a plurality of magnetic heads aligned on the work 101 are arranged discontinuously as shown in FIGS. 3(a),3(b), it is difficult to correct the camber of the work 101 by using the bending arm 106. Thus, the characteristics of the magnetic heads on the work 101 after the lapping do not become uniform.

Such camber of the work 101 is generated by several causes. As the causes, for example, there are the alignment error generated when a plurality of magnetic heads are formed on one substrate by the thin film growing technology, or the alignment error of the mask employed to pattern the thin film on the substrate, or the minute undulation of the cutting surface generated when the works 101 are formed by cutting the circular substrate, or the chips generated by cutting the substrate, or the flatness difference of the work contact surface of the lapping jig 102, or the fine dusts that are present between the work 101 and the lapping jig 102, etc.

Also, as another problem, when the crown, the camber, or the twist, as shown in FIGS. 4(a) to 4(c), is generated in the shape after the work 101 is lapped, variation in a floating amount of the sliders obtained by dividing the work 101 or deterioration of the characteristics of the magnetic head is caused.

DISCLOSURE OF THE INVENTION

It is an object of the present invention to provide a lapping machine and a lapping method capable of lapping a work while correcting appropriately a camber of the work, and a method of manufacturing a magnetic head slider using the lapping method.

The above subject can be overcome by providing a lapping machine which comprises a lapping surface plate rotated by a rotating mechanism, a lapping jig having a plurality of projections to bottom surfaces of which a work to be lapped by a lapping surface on the lapping surface plate is fitted, variation-of-projection adjusting elements for adjusting the variation of the plurality of projections to the lapping surface plate individually, and a control circuit for outputting variation-of-projection control signals to the variation-of-projection adjusting elements.

In the lapping machine, preferably a plurality of resistive elements which are lapped by the lapping surface of the lapping surface plate are fitted to the work, and the control circuit has a function for calculating resistance values of the plurality of resistive elements.

Also, the above subject can be overcome by providing a lapping method which comprises the steps of fitting a bar-like work, which is lapped by a lapping surface of the lapping surface plate, to bottom surfaces of a plurality of projections of a lapping jig, adjusting a variation of the projections by variation-of-projection adjusting elements individually, and lapping the work by the lapping surface.

In the lapping method, preferably the work is separated between the projections before lapping of the work.

In the lapping method, preferably resistive elements arranged on the projections respectively are formed on the work, and resistance values of a plurality of resistive elements are measured, and then the variation-of-projection of the projections is increased as a resistance value is smaller.

According to the lapping machine and the lapping method of the present invention, a plurality of projections are provided to the lapping jig, the work is fitted to bottom surfaces of the projections, and a variation of the projections is adjusted individually. Therefore, discontinuous positional displacement of the work can be corrected at a plurality of locations individually by changing a variation of a plurality of projections individually, and thus the camber of the work can be corrected with good precision.

Also, in the case that the work is divided into a plurality of pieces finally, the operability can be improved if the projections are provided in the same number as the division and then the work is divided at spaces between a plurality of projections before or after the lapping of the work.

In addition, if the resistive elements are formed on the work, resistance values of the resistive elements are changed in compliance with the lapping of the resistive elements. Therefore, it is possible to grasp easily the lapping progress situation and the amount of camber by detecting the resistance values of all the resistive elements. Then, if a variation of the projections is changed based on the variation in magnitude of the resistance values of the resistive elements by the lapping, it is possible to render the amount of lapping of the work to coincide with the target value by making uniform the resistance values of the resistive elements.

Further, the above subject can be overcome by providing a magnetic head manufacturing method which comprises a step of forming a bar-like work on which a plurality of magnetic heads are aligned, a step of fitting the work to bottom surfaces of a plurality of projections of a lapping jig such that the magnetic heads are overlapped with the projections respectively, a step of adjusting a variation of the plurality of projections by a plurality of variation-of-projection adjusting elements individually, and a step of lapping the magnetic heads, whose top end positions are adjusted by adjusting the variation of the projections on the work, by a lapping surface of the lapping surface plate.

In the magnetic head forming method, preferably the work is divided into plural pieces between the projections before adjustment of the variation of the projections.

In the magnetic head forming method, preferably a plurality of resistive elements that are arranged on the plurality of projections individually are formed on the work, and resistance values of the plurality of resistive elements are measured respectively, and then the variation of the projections is increased as a resistance value is smaller.

According to the magnetic head manufacturing method of the present invention, a plurality of projections are provided to the lapping jig, the work on which a plurality of magnetic heads are aligned is fitted to bottom surfaces of the projections, and a variation of projection of the projections is adjusted individually. Therefore, discontinuous positional displacement of the work can be corrected at a plurality of locations individually by changing a variation of a plurality of projections individually, and thus the camber of the work can be corrected with good precision.

Also, in the case that the work is divided into chip-like sliders, the operability can be improved if the projections are provided in the same number as the division and then the work is divided between a plurality of projections before or after the lapping of the work.

In addition, if the resistive elements are formed on the work, resistance values of the resistive elements are changed in compliance with the lapping of the resistive elements. Therefore, it is possible to grasp easily the lapping progress situation and the amount of camber by detecting the resistance values of all the resistive elements. Then, if a variation of the projections is changed based on the variation in magnitude of the resistance values of the resistive elements by the lapping, it is possible to render the amount of lapping of the work to coincide with the target value by making uniform the resistance values of the resistive elements.

In this case, as the resistive elements, the monitoring dedicated resistive elements formed on the work may be employed, otherwise the magneto-resistive effect elements of the magnetic heads may be employed.

The above subject can be overcome by providing a magnetic head manufacturing method comprising the steps of fitting a bar-like work having a plurality of magnetic heads and a plurality of resistive elements, that are lapped by a lapping surface of a lapping surface plate, to a lower surface of a lapping jig, connecting a plurality of pushing/pulling mechanisms, that push down and pull up the lapping jig in a vertical direction with respect to the lapping surface, to a plurality of operation points of the lapping jig, measuring individual reference bending curves of the pushing/pulling mechanisms when a reference pushing/pulling force is applied to the lapping jig while selecting one of the pushing/pulling mechanisms sequentially, measuring a current shape of a lower surface of the work, setting a target shape of the work, calculating a correction shape that is a difference between the current shape and the target shape, calculating one pushing/pulling curve that is most approximate to the correction shape, by multiplying respective reference bending curves of the plurality of pushing/pulling mechanisms by an optimization ratio individually and then superposing them, and adjusting heights of the magnetic heads by lapping the work, the magnetic heads, and the resistive elements by virtue of friction between the lapping surface and them, while pushing/pulling the lapping jig to/from the lapping surface by the plurality of pushing/pulling mechanisms by applying pushing/pulling amounts, that are derived by multiplying the plurality of reference bending curves by the optimization ratio individually, to the plurality of pushing/pulling mechanisms.

According to the present invention, if pushing amounts or pulling amounts that are applied to a plurality of operation points of the lapping jig are optimized when the work that is equipped with the magnetic heads is lapped, the camber of the work and the curve obtained by connecting the top ends of the magnetic heads can be approximated to the target shape curve with high precision.

Moreover, the above subject can be overcome by providing a lapping machine which comprises a lapping surface plate rotated by a rotating mechanism, a lapping jig to a lower surface of which a work to be lapped by a lapping surface of the lapping surface plate is fitted, a sliding surface formed in the lapping jig, a plurality of pushing/pulling elements brought slidably into contact with the sliding surface, and a plurality of actuators for driving the plurality of pushing/pulling elements vertically with respect to the lapping surface.

According to the present invention, when the work is lapped, the pushing positions or the pulling positions applied to a plurality of operation points of the lapping jig can be optimized. Thus, the camber of the work can be approximated to the target shape curve with high precision.

BEST MODES FOR CARRYING OUT THE INVENTION

Embodiments of the present invention will be explained with reference to the accompanying drawings hereinafter.

(First Embodiment)

Figure 5:
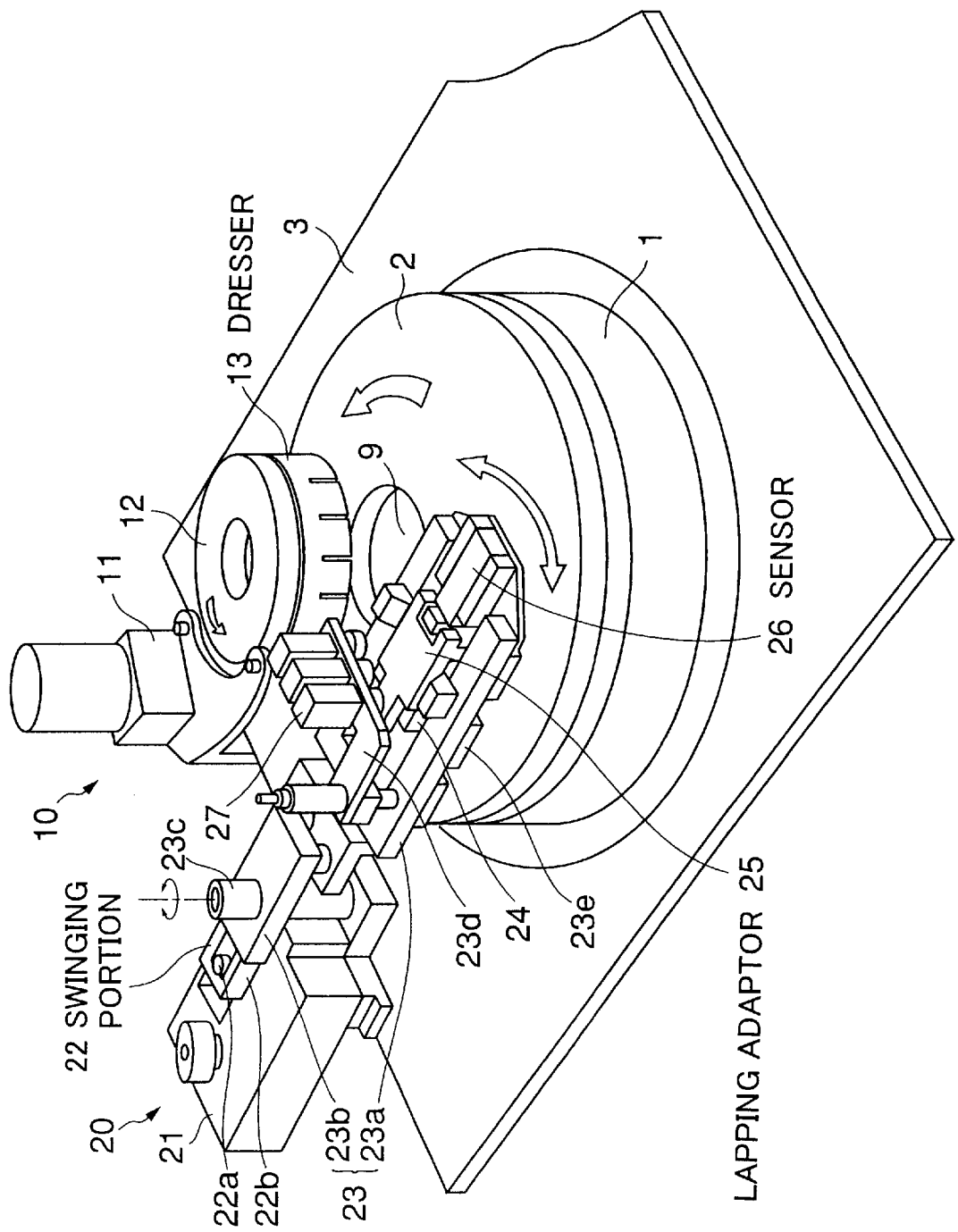
FIG. 5 is a perspective view of a lapping machine according to a first embodiment of the present invention.

FIG. 5 is a perspective view of a lapping machine according to a first embodiment of the present invention.

In FIG. 5, a dresser mechanism 10 and a work supporting mechanism 20 are arranged on a lapping surface plate 1 that is rotated by a rotating mechanism 9.

A lapping machine 2 having a lapping surface is stuck onto the lapping surface plate 1, and an abrasive (slurry) is supplied onto the lapping machine 2 from an abrasive supplying means (not shown).

Also, the dresser mechanism 10 has a rotating ring 12 that is rotated by a rotating mechanism 11 fixed to a base 3 provided around the rotating surface plate 1. A dresser 13 for spreading smoothly the abrasive supplied onto the lapping machine 2 is fitted under the rotating ring 12.

The work supporting mechanism 20 comprises a fixing portion 21 fitted onto the base 3, a swinging portion 22 fitted to the fixing portion 21, a Y-shaped lapping base 23 fitted to the swinging portion 22, an unloading portion 24 put between a U-shaped arm 23a in front of the lapping base 23, a lapping adaptor 25 fitted to the lapping base 23 and arranged to cover the unloading portion 24 from the top, and a sensor 26 fitted to the lapping base 23 in front of the lapping adaptor 25.

The swinging portion 22 has an eccentric axis 22a that is connected to an axis of a motor (not shown) fitted in the fixing portion 21, and a longitudinal hole 22b into which the eccentric axis 22a is inserted. Then, if the eccentric axis 22a is rotated and shifted along a predetermined track with the rotation of the axis of the motor, such eccentric axis 22a causes the swinging portion 22 to swing in the lateral direction while moving longitudinally in the longitudinal hole 22b.

A rear portion of 23b of the lapping base 23 fixed to the top end of the swinging portion 22 is supported rotatably in front of the swinging portion 21 by an axis 23c. Since the rear portion of 23b of the lapping base 23 positioned on the rear side rather than the axis 23c is swung together with the swinging portion 22, the portion of the lapping base 23 in front of the axis 23c is swung around the axis 23a in compliance with the swing of the swinging portion 21.

A rear portion of the lapping adaptor 25 is supported rotatably in the vertical direction on the rear portion of the arm 23a of the lapping base 23. Also, an L-shaped tool 23d is fixed to a part of the arm 23a, and the L-shaped tool 23d supports a pressure machine 27 over the lapping adaptor 25. In addition, the lapping base 23 has a plurality of bearing surfaces 23e on its lower side.

Figure 6:
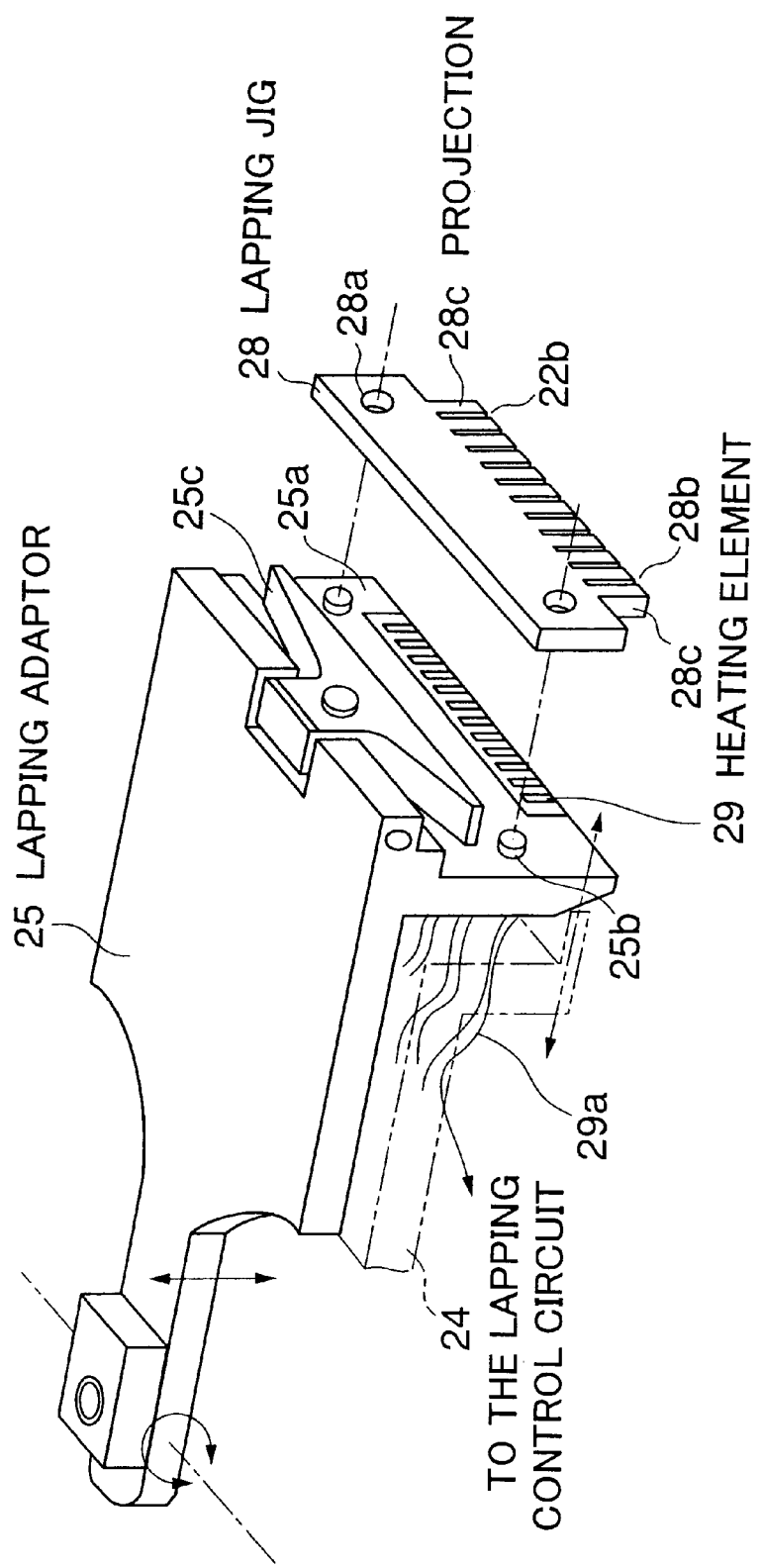
FIG. 6 is a perspective view showing a lapping adaptor and a lapping jig fitted to the lapping machine shown in FIG. 5.

As shown in FIG. 6, a jig fitting surface 25a to a front surface of which a lapping jig 28 is fitted to drop downward is provided to the top end portion of the lapping adaptor 25. Also, fixing pins 25b that are set into positioning holes 28a of the lapping jig 28 are formed on the jig fitting surface 25a. In addition, a fixing block 25c that is fitted onto the jig fitting surface 25a to push the lapping jig 28 against the fixing pins 25b is fitted swingably to the top end portion of the lapping adaptor 25.

A plurality of projections 28c that are separated via grooves 28b are formed like a comb on the lower portion of the lapping jig 28. Also, a plurality of heating elements 29 are formed on the jig fitting surface 25a of the lapping adaptor 25. Then, rear surfaces of a plurality of projections 28c are brought into contact with the heating elements 29 individually in the state that the lapping jig 28 is fitted to the lapping adaptor 25.

Lead wires 29a are connected to both ends of the heating elements 29, and then these lead wires 29a are connected to a lapping control circuit 36 described later. A current is supplied from the lapping control circuit 36 to the heating elements 29 via the lead wires 29a. The heating elements 29 are a variation-of-projection adjusting element that adjusts a variation of the projections 28c according to the control of the heating temperature respectively, and are constructed by a resistor whose temperature is increased with the increase of the supplied current, etc. respectively.

Next, a method of lapping the elements formed on a bar-like work (lapping object) 30 shown in FIG. 7 by using the above lapping machine will be explained hereunder.

The work 30 has a substrate 31 made of material such as alumina titanium carbide ($Al_2O_3TiC$), ferrite, calcium titanate, etc., a plurality of magnetic heads (electromagnetic transducers) 32 that are composed of magnetoresistive effect elements, induction elements, etc. and aligned on the substrate 31, and monitoring resistive elements 33 positioned adjacent to the magnetic heads 32 respectively.

Top ends of the magnetic heads 32 and top ends of the monitoring resistive elements 33 are placed on the same plane as a lower surface of the work 30 respectively.

The works 30 are obtained by dividing the substantially disk-like substrate 31. A cutting surface of the substrate 31 is the lower surface of the work 30.

The magnetic heads 32 and the monitoring resistive elements 33 are leaded electrically to a plurality of pads 30a to 30f on the work 30.

Figure 8:
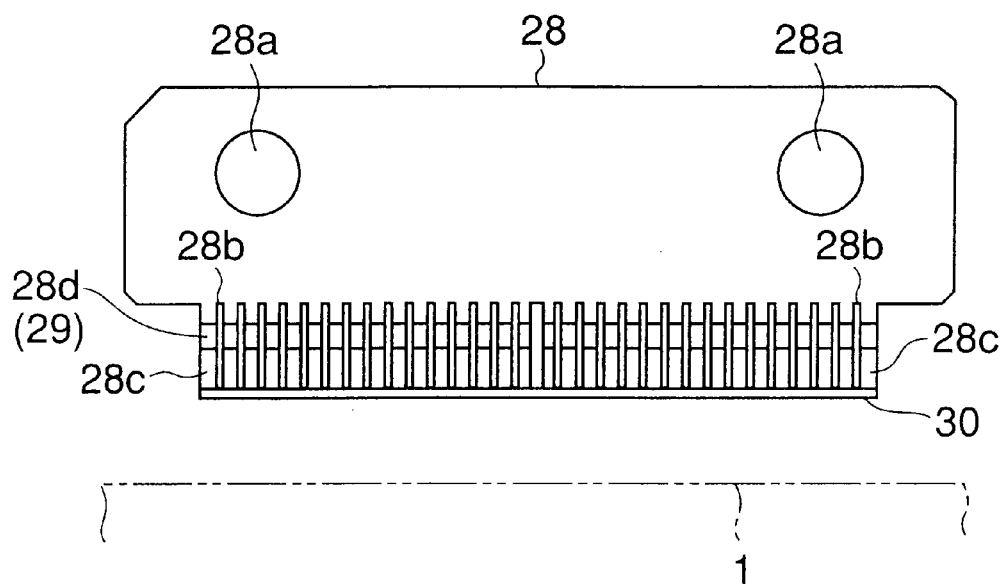
FIG. 8 is a front view showing a state in which the work is fitted to the lapping jig shown in FIG. 6.

Then, as shown in FIG. 8, first the work 30 is fitted to a top end surface of the lapping jig 28 via the adhesive. In this case, the top ends of the magnetic heads 32 and the top ends of the monitoring resistive elements 33 on the work 30 are directed toward the lapping surface plate 1 respectively. In addition, the work 30 is positioned on the lapping jig 28 in the state that one magnetic head 32 and one monitoring resistive element 33 are overlapped with one projection 28c of the lapping jig 28. This means that the projections 28c exist to correspond to the number of the magnetic heads 32.

In this case, a symbol 28d in FIG. 8 denotes a heating area that comes into contact with the heating elements 29.

Figure 9:
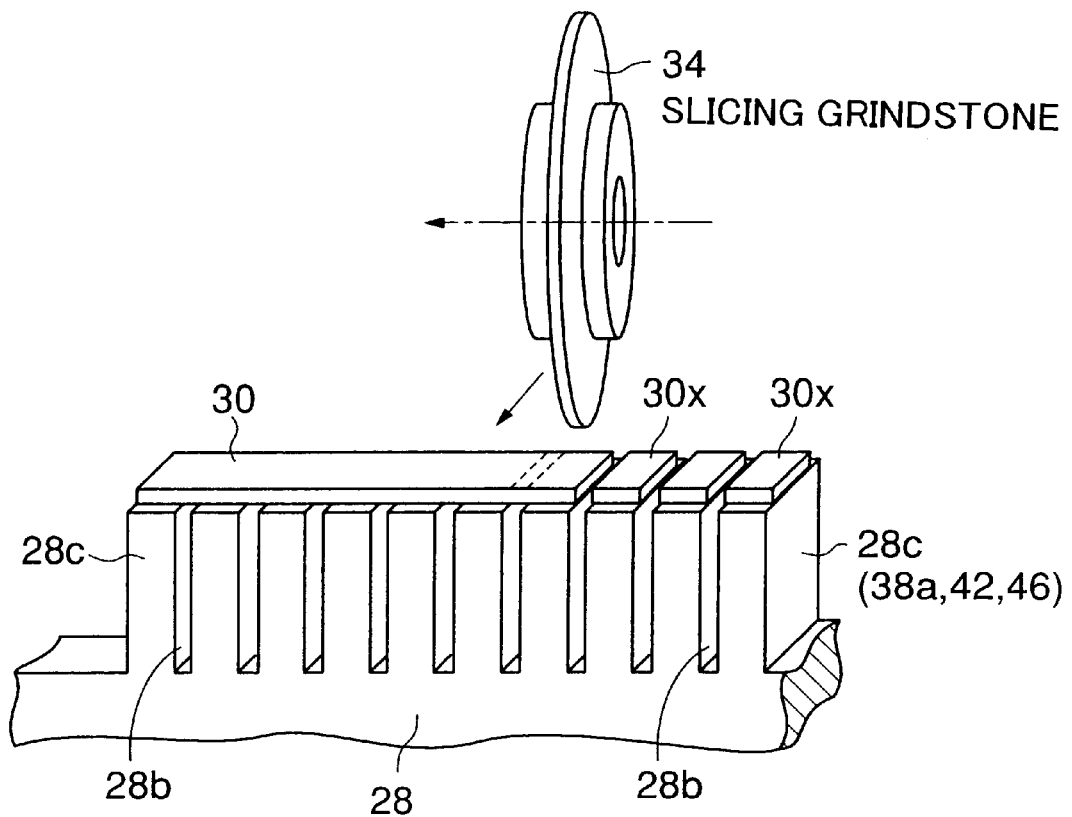
FIG. 9 is a perspective view showing a state in which the work shown in FIG. 8 is divided.
Figure 10:
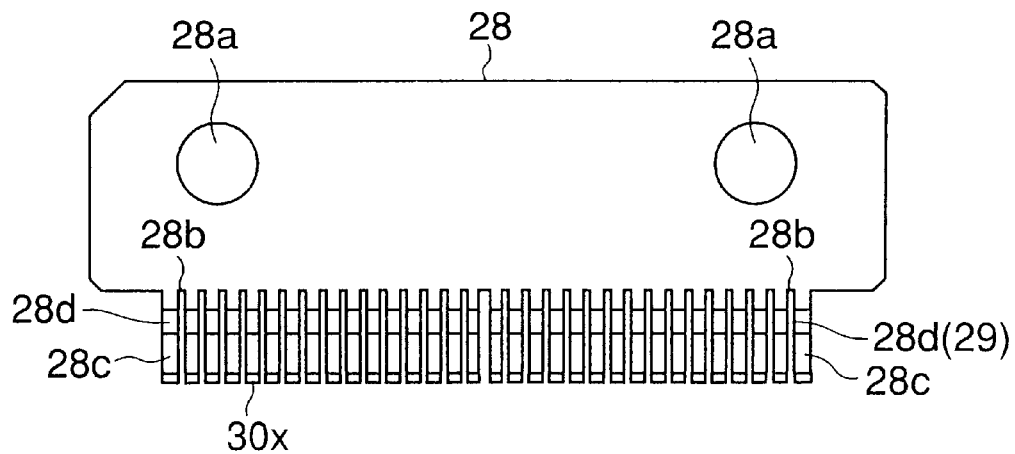
FIG. 10 is a front view showing a state after the work shown in FIG. 8 is divided.

As shown in FIG. 9 and FIG. 10, the work 30 fitted to the lapping jig 28 in such manner is divided into a plurality of chip-like sliders 30x by a slicing grindstone 34 in unit of the projection 28c. In this case, if the work 30 is divided by inserting teeth of the slicing grindstone 34 into the grooves 28b between the projections 28c, the positioning of the slicing grindstone 34 can be facilitated.

A plurality of magnetic head sliders 30x are generated by the division of the work 30. Then, one magnetic head 32 and one monitoring resistive element 33 are present on one slider 30x.

Figure 11B:
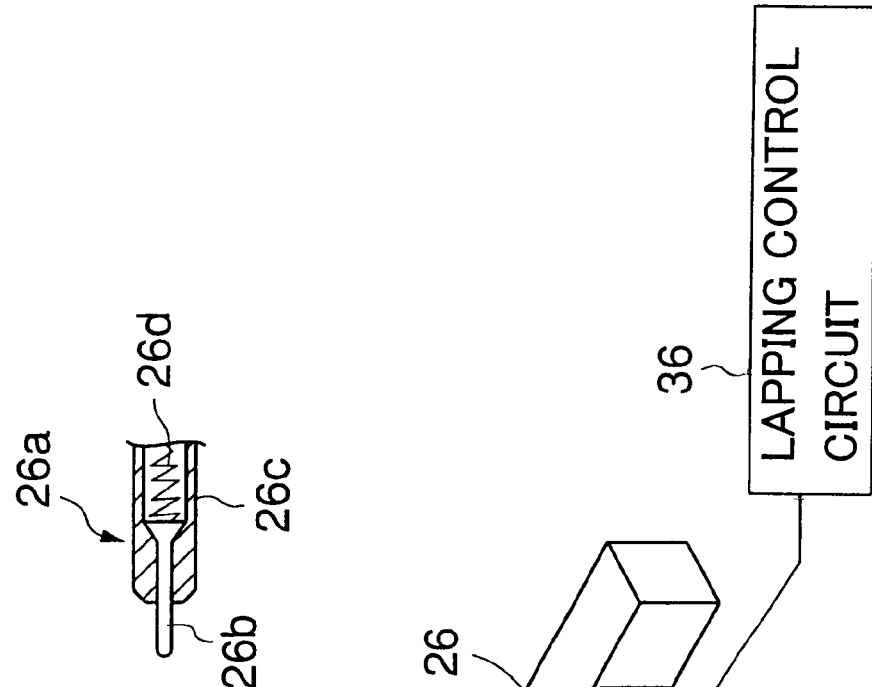
FIG. 11(b) is a sectional view of a probe of the sensor shown in FIG. 11(a)
Figure 11A:
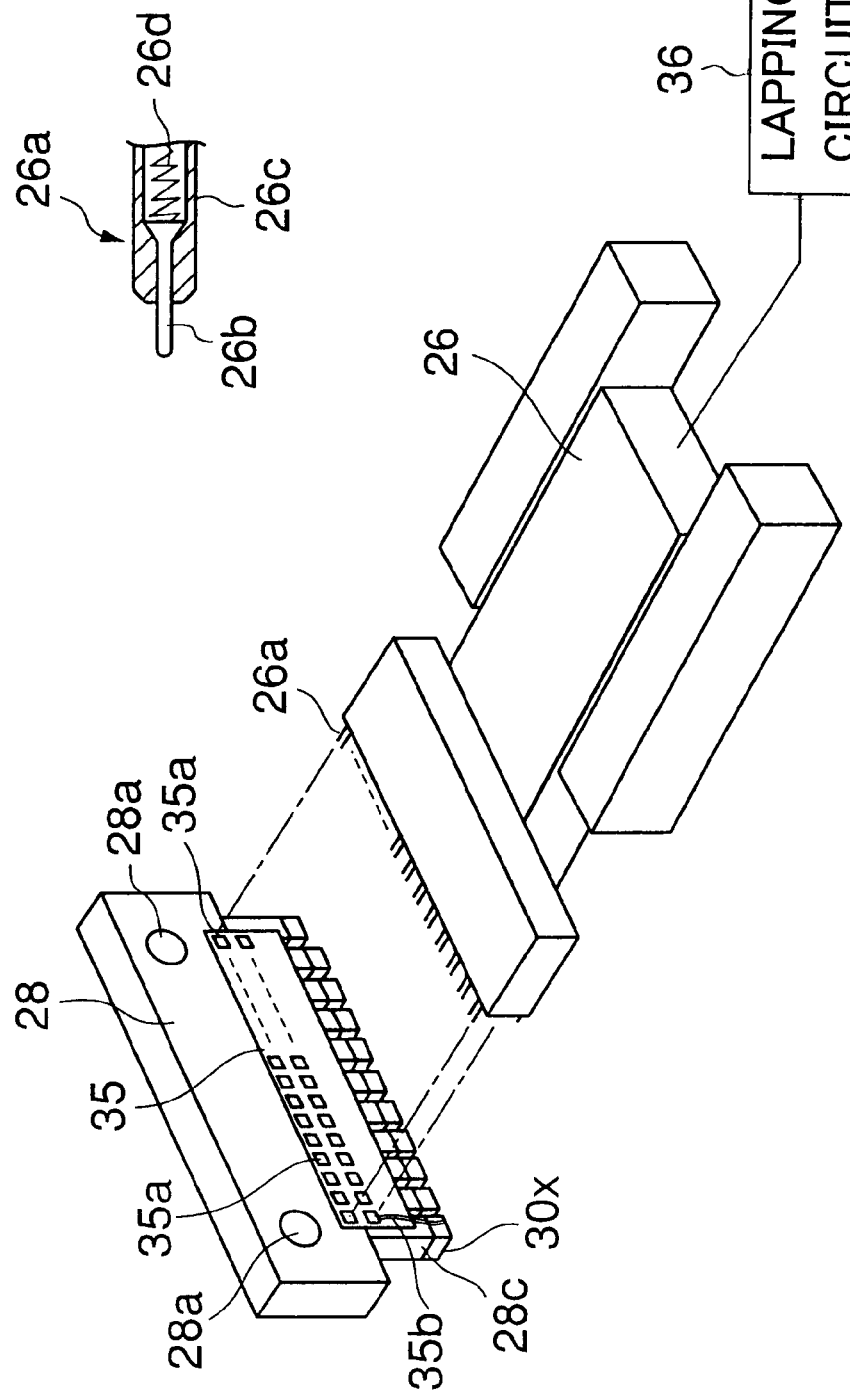
FIG. 11(a) is a perspective view showing the lapping jig and a sensor fitted to the lapping machine shown in FIG. 5.

As shown in FIG. 11(a), a plurality of pads 30a to 30f appearing on the slider 30x are electrically connected to pads 35a on a relay printed board 35, which is pasted onto a front surface of the lapping jig 28, via lead wires 35b respectively.

Then, as shown in FIG. 11(a), in the state that the lapping jig 28 is fixed to the lapping adaptor 25, probes 26a of the sensor 26 are connected to pads 35a on the relay printed board 35 in front of the lapping jig 28.

As shown in FIG. 11(b), the probe 26a has a conductive pin 26b which is passed through an end portion of a conductive cylindrical body 26c. The pin 26b is pushed toward the relay printed board 35 by a spring 26d.

As described above, the lapping of the lower surface of the slider 30x, the top ends of the magnetic heads 32, and the top ends of the monitoring resistive elements 33 is started after the work 30 is fitted to the lapping jig 28, then a plurality of sliders 30x are formed by dividing the work 30, then the lapping jig 28 is fitted to the lapping adaptor 25, and then the probes 26a of the sensor 26 are connected to the monitoring resistive elements 33 via the relay printed board 35.

The lapping is carried out by bringing the sliders 30x into contact with the lapping machine 2 while rotating the lapping surface plate 1 shown in FIG. 5 to swing the lapping base 23 along the lapped surface.

Since heights of the monitoring resistive elements 33 are reduced with the progress of the lapping, resistance values of the monitoring resistive elements 33 are increased. A constant current is supplied to the monitoring resistive elements 33 from the lapping control circuit 36 via the relay printed board 35 and the sensor 26. Then, the lapping control circuit 36 calculates the resistance values by measuring voltages of the monitoring resistive elements 33 respectively.

It is desired that the lapping of a plurality of sliders 30x should be carried out to make equal the resistance values of the monitoring resistive elements 33 on these sliders 30x.

Since the camber is generated in most of the works 30, the uniform lapping of a plurality of monitoring resistive elements 33 and a plurality of magnetic heads 32 is difficult. In the present embodiment, since the work 30 is divided into a plurality of sliders 30x prior to the lapping of the work 30, variation in the lapping due to the camber generated in the work 30 can be reduced.

However, if positions of the lapped surfaces of the sliders 30x are not uniform or if displacement between the neighboring plural monitoring resistive elements 33 or the neighboring plural magnetic heads 32 is generated, variation in change of the resistance values of the monitoring resistive elements 33 is caused in the course of the lapping. Therefore, if an amount of current supplied to the heating elements 29 shown in FIG. 6 is controlled, the temperature applied to the projections 28c of the lapping jig 28 from the heating elements 29 can be adjusted. A variation of the projections 28c is increased by the thermal expansion when the temperature is risen. On the contrary, a variation of projection is reduced by the thermal contraction when the temperature is fallen down.

Accordingly, if the variation of the projections 28c toward the lapping surface plate 1 is adjusted by controlling the temperature of the heating elements 29, the lapping speed of the sliders 30x can be adjusted. Therefore, it is possible to uniformize the resistance values of the monitoring resistive elements 33 on the sliders 30x.

Figure 12:
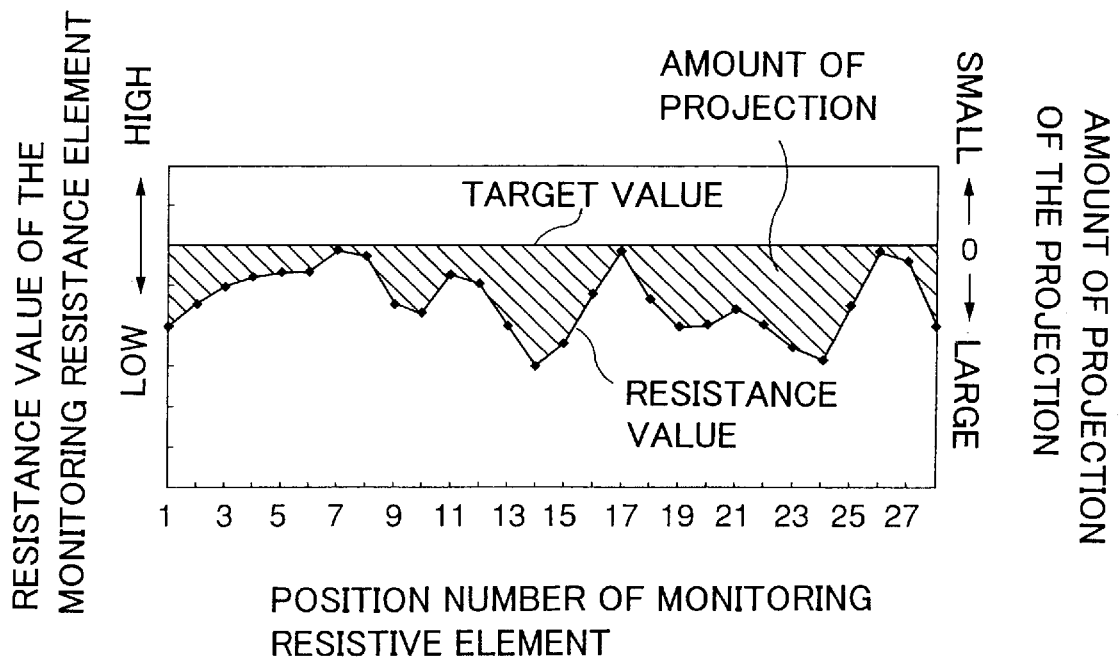
FIG. 12 is a view showing an example of a position of a lapped surface of the work, that is lapped by the lapping machine shown in FIG. 5, and a variation of projections.

For example, as shown in FIG. 12, in case there is the variation of the resistance values among the 1-st to 28-th sliders 30x and thus the resistance value of the n-th monitoring resistive element 33 is low, a variation of projection of the n-th slider 30x is increased by increasing the temperature of the n-th heating element 29. Therefore, the lapping speed of the n-th slider 30x is increased and also the resistance value is increased.

The lapping is stopped at a point of time when difference in the resistance among the monitoring resistive elements 33 on a plurality of sliders 30x becomes zero or when such difference can be suppressed within a predetermined range. To uniformize the resistance values of the monitoring resistive elements 33 signifies to uniformize the height of the monitoring resistive elements 33. Accordingly, the heights of a plurality of magnetic heads 32 under the lapping jig can also uniformized.

In this case, if a magnetoresistive effect layer is present in the magnetic head 32, such magnetoresistive effect layer may be employed as the monitoring resistive element.

In the above explanation, the heating elements 29 are fitted to the front surface of the jig fitting surface 25a. But the heating elements 29 may be fitted to the heating areas 28d of the projections 28c of the lapping jig 28.

In the above explanation, in order to adjust a variation of the projections 28c of the lapping jig 28, the mechanism for thermally expanding the projections 28c is provided. In this case, structures described in the following may be employed.

Figure 13:
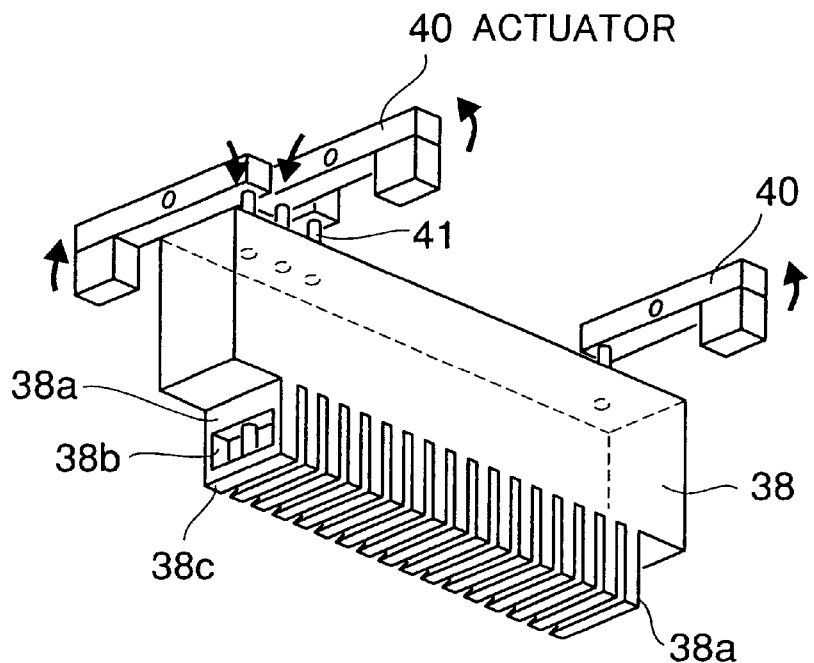
FIG. 13 is a perspective view showing another example of the lapping jig.

As a first example, as shown in FIG. 13, openings 38b are formed in projections 38b of a lapping jig 38, then resilient surfaces 38c are provided to lower ends of the openings 38b, and then pushing pins 41 which are moved vertically by piezo-electric actuators 40 from the upper side of the lapping jig 38 to the resilient surfaces 38c via the openings 38b are inserted. Then, if the pushing pins 41 are moved vertically by the actuators 40, positions of the resilient surfaces 38c of the projections 38 are adjusted vertically and thus the positions of the sliders 30x fitted to the resilient surfaces 38c can be adjusted.

Figure 14:
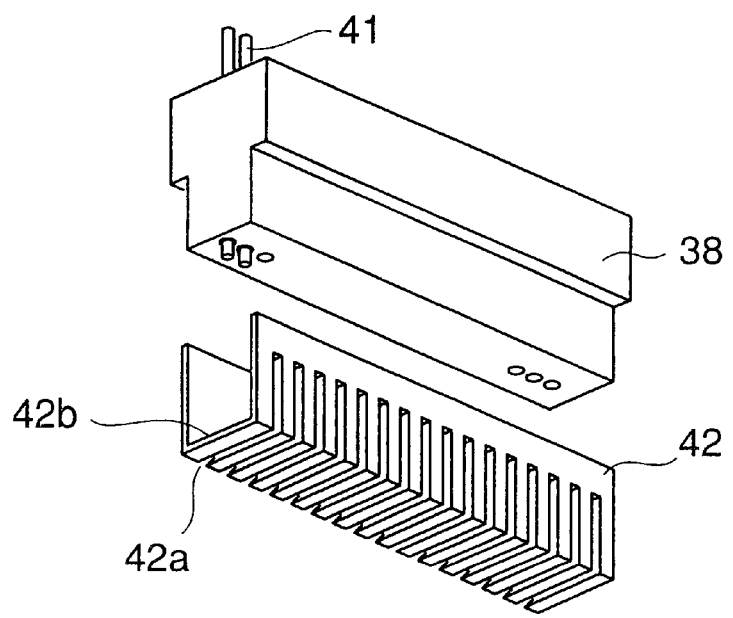
FIG. 14 is a perspective view showing an example in which a part of the lapping jig in FIG. 13 is modified.

Such a structure may be employed that a lower part of the lapping jig 38 is formed of a leaf spring 42 having a U-shaped sectional shape shown in FIG. 14 and then a plurality of projections 42a are formed by dividing a lower portion of the leaf spring 42 by grooves 42a. In this case, the lower surface of the U-shaped projections 42a act as the resilient surfaces, and then the sliders 30x are fitted to the surfaces.

Figure 15:
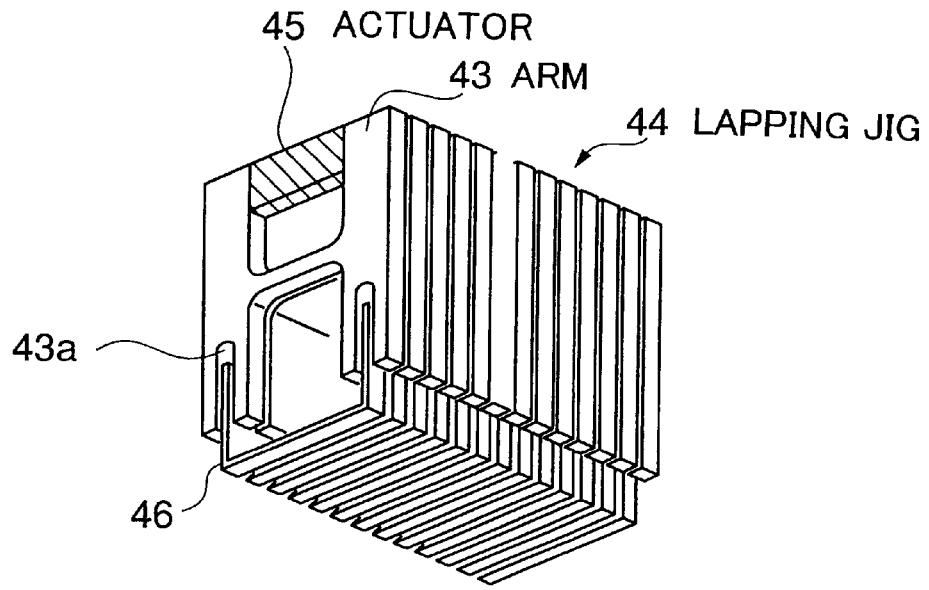
FIG. 15 is a perspective view showing still another example of the lapping jig.

As a second example, as shown in FIG. 15, there is a lapping jig 44 having a structure in which a plurality of H-shaped arms 43 shown in FIG. 15 are stacked at an interval. An elastic actuator 45 such as the piezo-electric element is put between both sides at one end of the arm 43, whereas both ends of the projection made of the U-shaped leaf spring are supported by two grooves 43a at the other end.

Figure 16A:
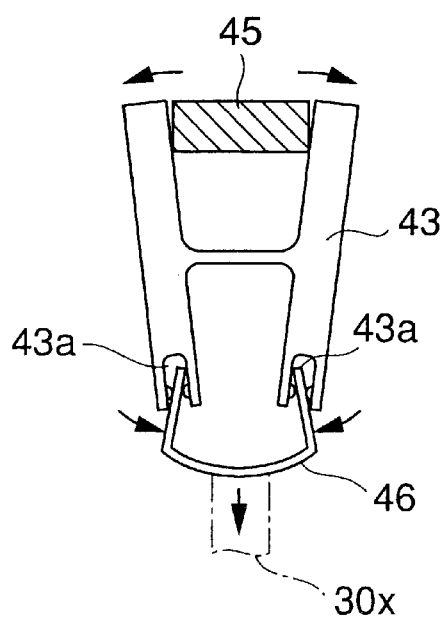
FIG. 16(a) is a side view showing a state in which a variation of the projections of the lapping jig shown in FIG. 15 is increased.
Figure 16B:
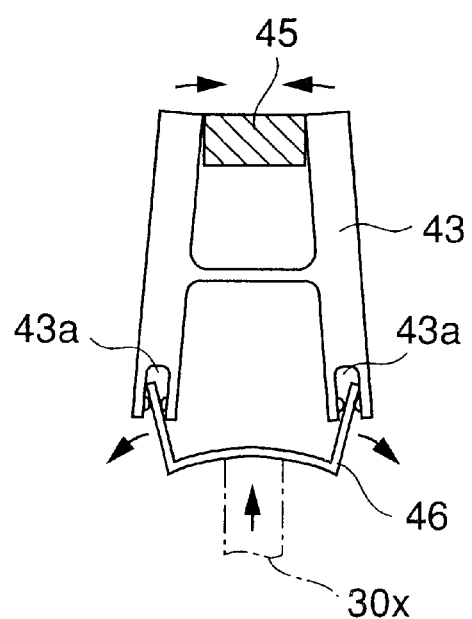
FIG. 16(b) is a side view showing a state in which a variation of the projections of the lapping jig shown in FIG. 15 is decreased.

Then, as shown in FIG. 16(a), if the actuator 45 provided at one end of the arm 43 expands, a distance of the other end of the arm 43 is narrowed. Accordingly, a distance between both sides of the projection 46 is decreased and thus a lower surface of the projection 46 is protruded downwardly. In contrast to this, as shown in FIG. 16(b), if the actuator 45 provided at one end of the arm 43 contracts, the distance of the other end of the arm 43 is widened. Accordingly, the distance between both sides of the leaf spring is increased, the lower surface of the projection 46 is retreated upwardly to become hollow. The slider 30x is fitted to the lower surface of the projection 46.

Then, if the position of the slider 30x fitted to the lower surface of the projection 46 is controlled by adjusting an amount of expansion/contraction of the actuator 45 fitted to one end of the arm 43, the heights of the monitoring resistive elements 33 and the magnetic heads 32 on the slider 30x can be made uniform.

In this case, as shown in FIG. 9, the sliders 30x which are fitted to lower surfaces of the resilient surfaces 38c of the projections 38 or lower surfaces of the projections 46 are obtained by dividing the work by virtue of the slicing grindstone 34.

Figure 17:
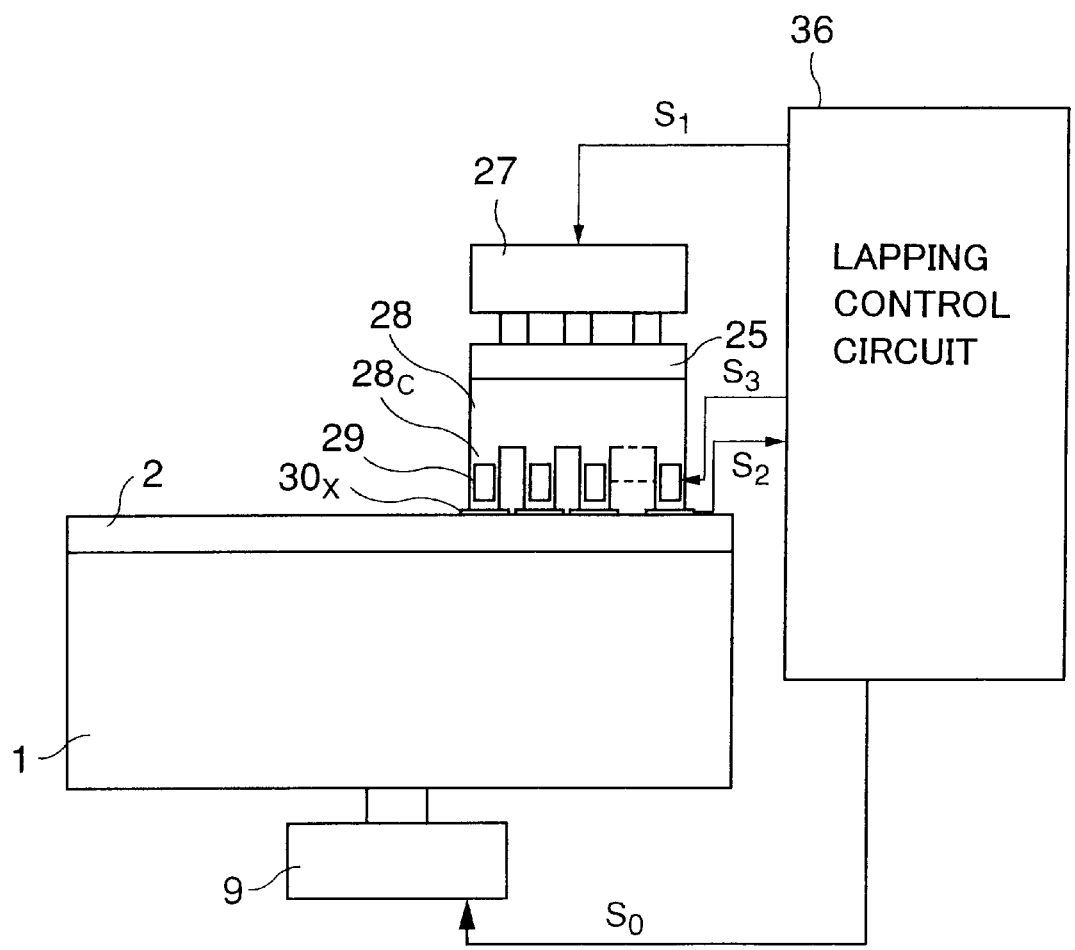
FIG. 17 is a view showing a control system of the lapping machine of the first embodiment of the present invention.
Figure 18:
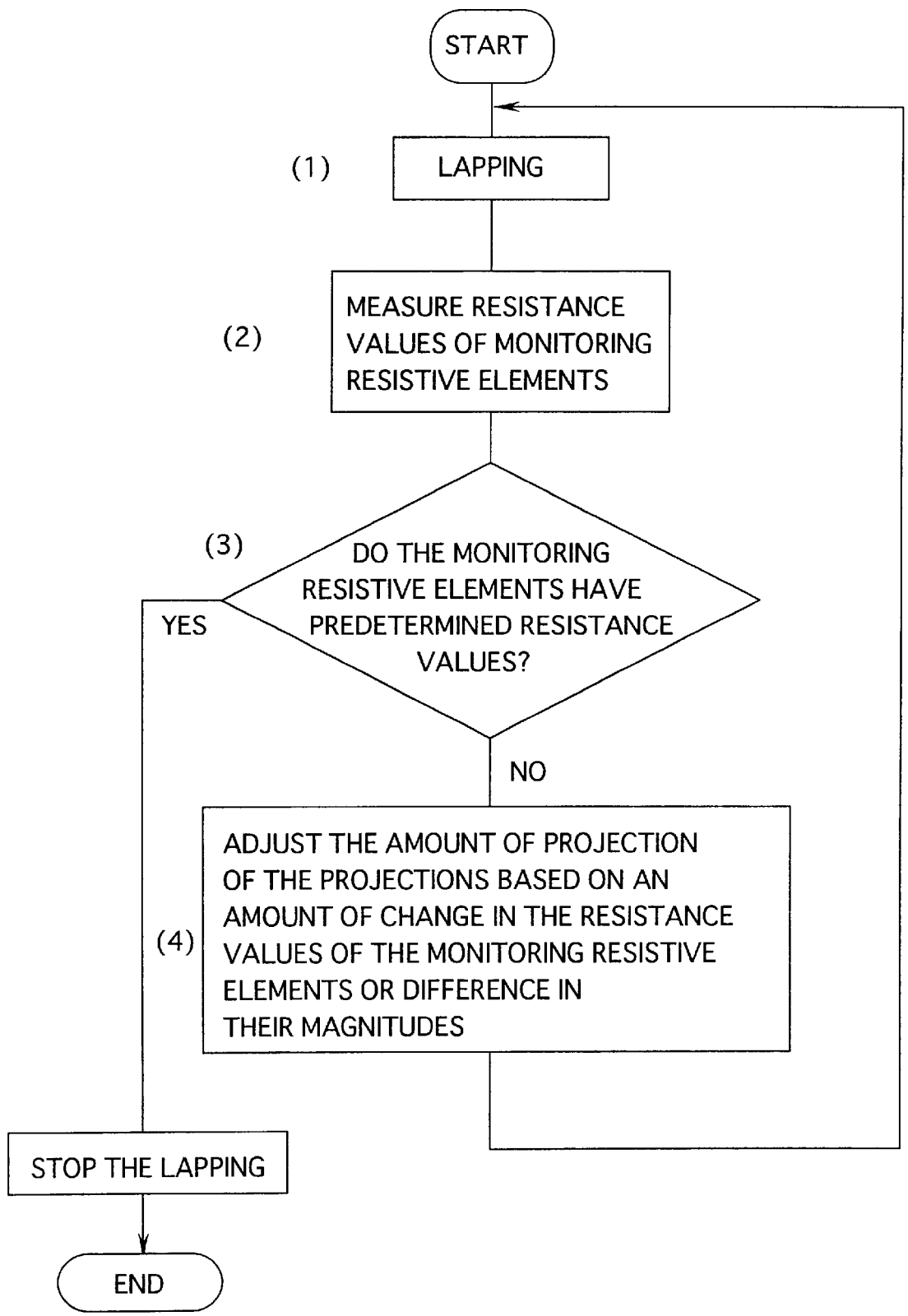
FIG. 18 is a flowchart showing an operation of the control system shown in FIG. 17.

FIG. 17 is block diagram of a control system of the above lapping machine. FIG. 18 is a flowchart showing lapping procedures made by the lapping machine.

In FIG. 17, in the state that the work 30 is fitted to the lower surfaces of the projections 28c of the lapping jig 28, the work 30 is divided into a plurality of sliders 30x. Then, the lapping jig 28 is fitted to the lapping adaptor 25, and the rotating mechanism 9 is controlled by a lapping-surface-plate number-of-revolution adjusting signal $S_0$ supplied from the lapping control circuit 36, and then the lapping surface plate 1 is rotated by the rotating mechanism 9 at a predetermined speed.

In addition, the lapping control circuit 36 sends a variation-of-pressure adjusting signal $S_3$ to the pressure machine 27, and the pressure machine 27 pushes the lapping jig 28 against the lapping machine 2 via the lapping adaptor 25.

Then, as shown in (1) of FIG. 18, the top ends of the sliders 30x and the monitoring resistive elements 33 are lapped by the lapping machine 2.

Then, as shown in (2) of FIG. 18, in the course of the lapping, the lapping control circuit 36 receives resistance value measuring signals $S_2$ from respective monitoring resistive elements 33 via the sensor 26 and then calculates the resistance values of the monitoring resistive elements 33.

Then, as shown in (3), (4) of FIG. 18, if these resistance values are not uniform, the lapping control circuit 36 sends a variation-of-projections adjusting signal $S_3$ to the heating elements 29 in FIG. 6 or the actuators 40 or 45 in FIG. 15 or FIG. 16 to adjust a variation of the projections 28c, 38a, 46 of the lapping jigs 28, 38, 44 in response to the magnitudes of the resistances. Thus, the lapping is still continued.

In contrast to this, as shown in (3), (5) of FIG. 18, if the resistance values of the monitoring resistive elements 33 have predetermined values, the lapping is stopped.

In the above explanation, the lapping is started after the work 30 is divided into a plurality of sliders 30x. However, since the camber of the work 30 can be corrected by changing a variation of the above projections even if the work is lapped as it is, the uniformization of the resistance values of the monitoring resistive elements 33 can be facilitated. In this case, the bar-like work 30 is divided on the projections 28c after the lapping.

In case the work 30 is lapped after such work 30 is divided or the bar-like work 30 is lapped as it is, the rail surface on the sliders 30x is formed after the lapping.

(Second Embodiment)

Figure 19:
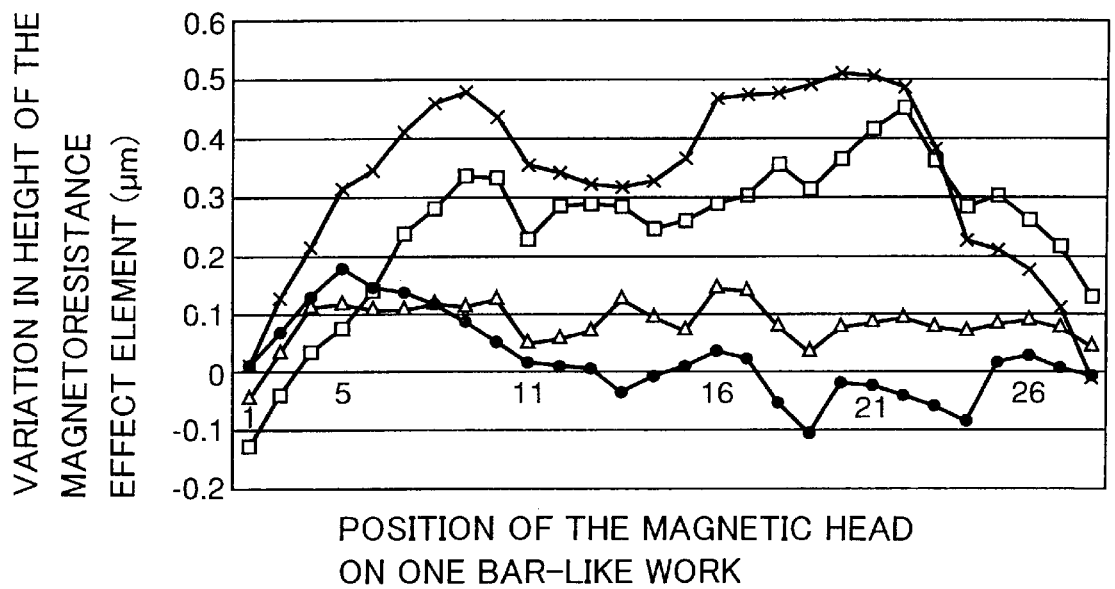
FIG. 19 is a view showing relationships between a longitudinal position of a plurality of works and top end positions of a plurality of magnetic heads formed on these works.

The lapping of one bar-like work is performed to make equal the heights of a plurality of magnetic heads formed on the work or the heights or the resistance values of a plurality of resistive elements. However, as described above, the top end positions of a plurality of magnetic heads and the top end positions of a plurality of resistive elements are varied as shown in FIG. 19, for example. Four curves in FIG. 19 indicate lines that connect the top end positions of a plurality of magnetic heads formed on four bar-like works.

Such unevenness of the top end positions of the magnetic heads and the top end positions of the resistive elements is due to reductions in the patterning precision of the magnetic heads and the resistive elements, the working precision when the bar-like works are cut out from the circular-disk substrate, etc.

Figure 1:
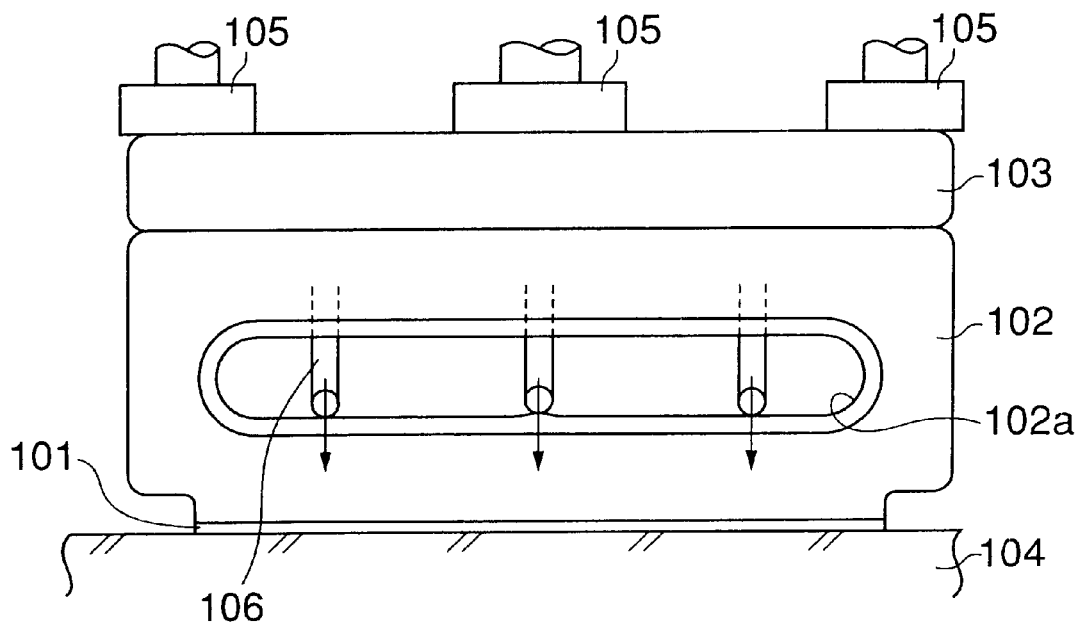
FIG. 1 is a front view showing a lapping state of a work in the prior art.
Figure 2:
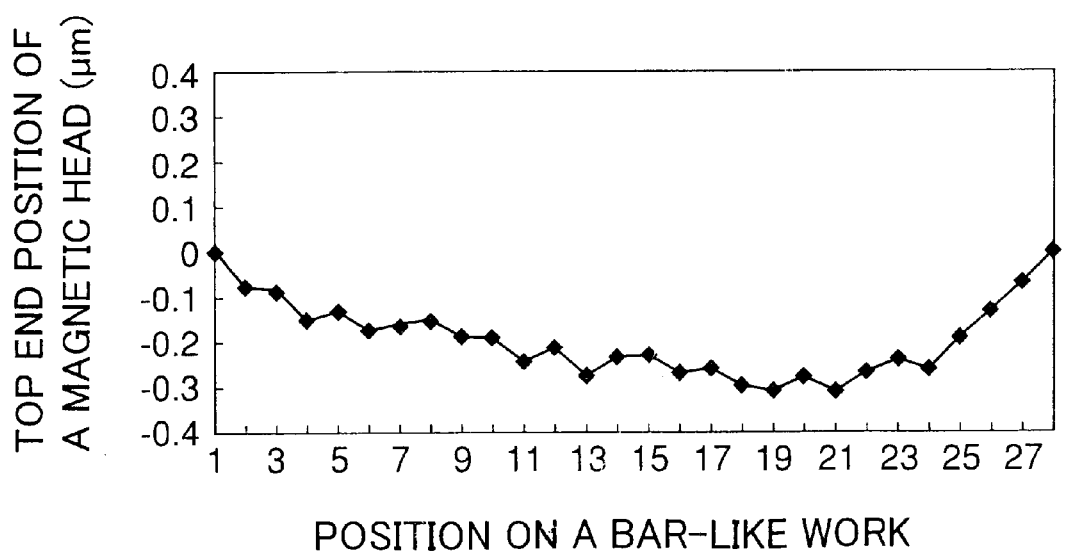
FIG. 2 is a distribution view of continuous camber of the work.
Figure 3A:
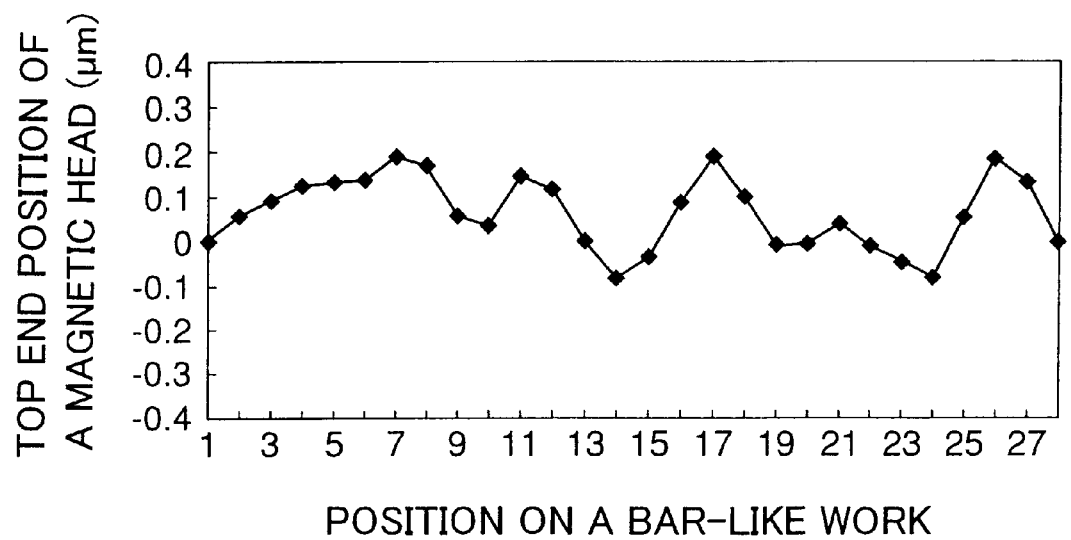
FIG. 3(a) is a first distribution view of discontinuous camber of the work.
Figure 3B:
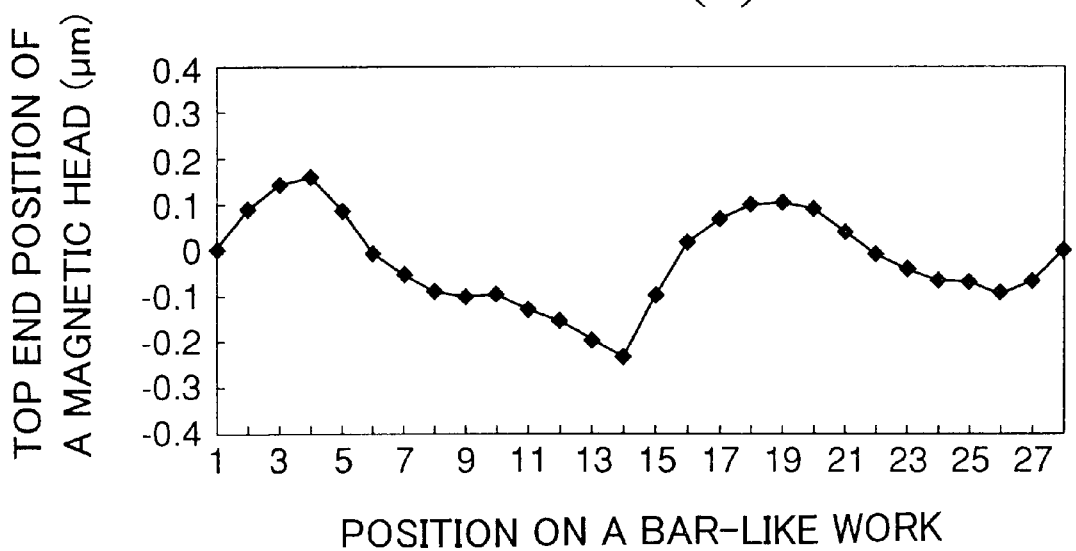
FIG. 3(b) is a second distribution view of discontinuous camber of the work.
Figure 4A:
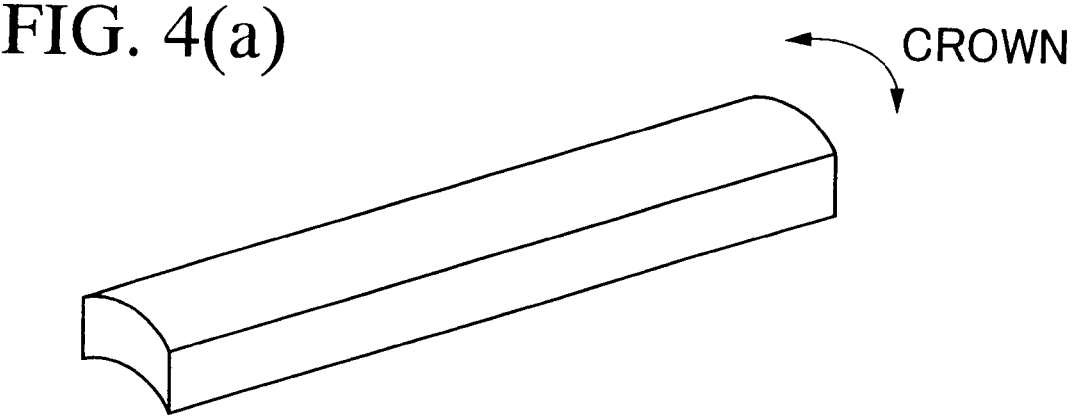
FIG. 4(a) is a perspective view showing the work in which a crown is generated.
Figure 4B:
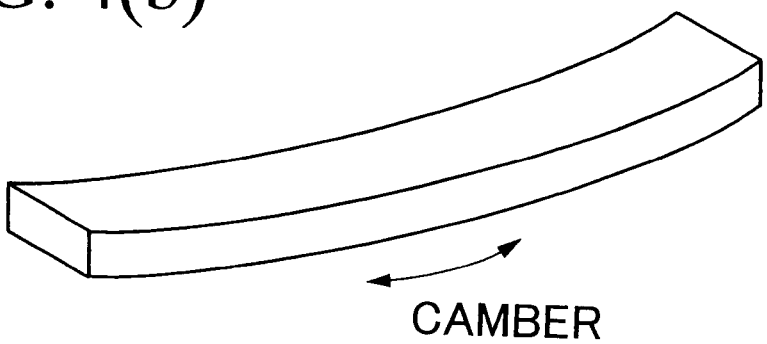
FIG. 4(b) is a perspective view showing the work in which a camber is generated.
Figure 4C:
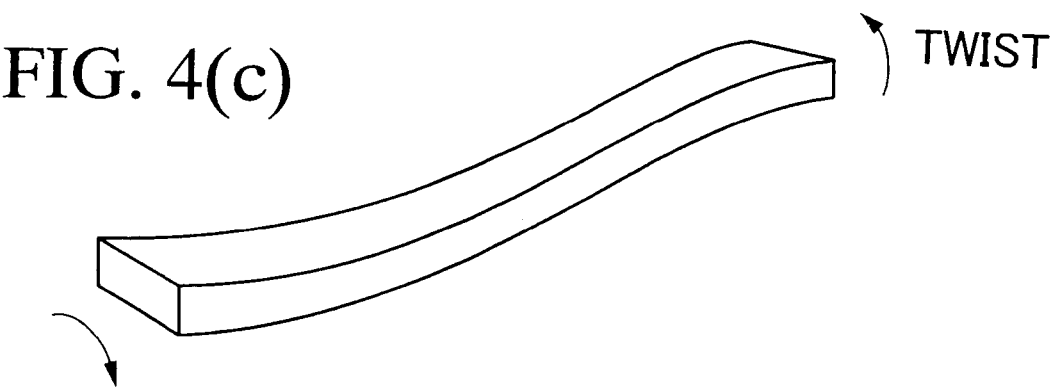
FIG. 4(c) is a perspective view showing the work in which a twist is generated.

In order to make equal the heights of the magnetic heads and the resistive elements, in the prior art, there is the method of adjusting the camber of the work or the top end positions of the magnetic heads by employing the bending arms 106, the lapping jig 102, etc., as shown in FIG. 1.

Figure 7:
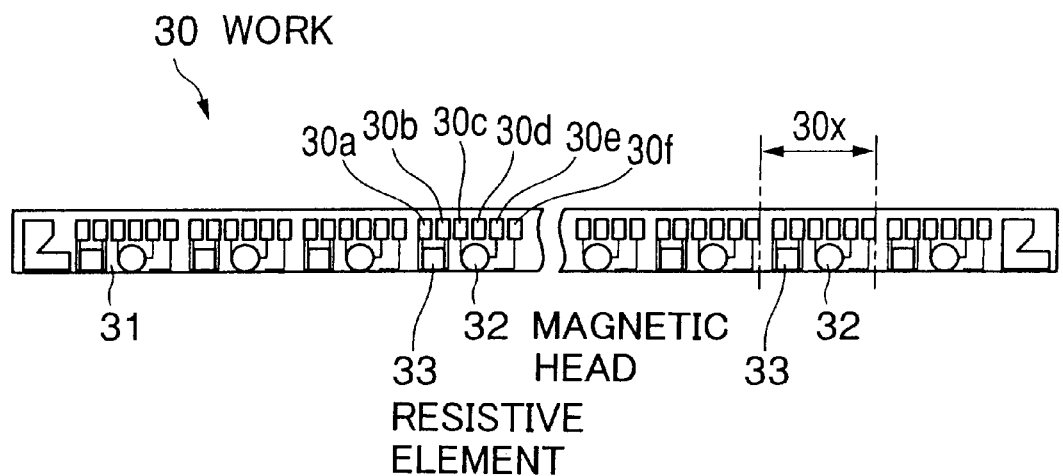
FIG. 7 is a front view showing a work equipped with a magnetic head that is lapped according to the first embodiment of the present invention.
Figure 20:
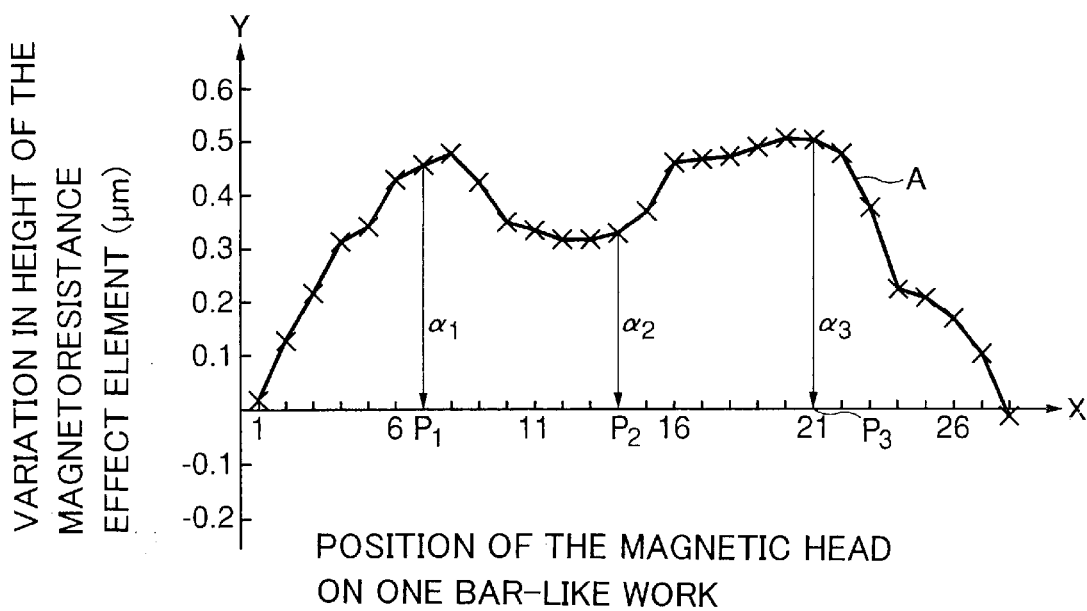
FIG. 20 is a view showing a profile curve obtained by connecting the top end positions of a plurality of magnetic heads on one work and an amount of correction made by three bending arms.

For example, in order to set the curves, that connect respective top end positions of a plurality of magnetic heads 32 and resistive elements 33 on one bar-like work 30 shown in FIG. 7, uniformly to a target shape (e.g., x-axis), three points of the work 30 are pushed by an amount of pushing $\alpha_1$, $\alpha_2$, $\alpha_3$ respectively, as shown in FIG. 20. The amounts of pushing $\alpha_1$, $\alpha_2$, $\alpha_3$ are differences between an element top end curves A and the x-axis. However, if the lower end of the lapping jig 102 is pushed or pulled by three bending arms 106 shown in FIG. 1, pushing forces of three bending arms 106 interfere with each other. Therefore, it is difficult to make constant the heights of a plurality of magnetic heads and a plurality of resistive elements by merely feeding back the differences $\alpha_1$, $\alpha_2$, $\alpha_3$ between three points of the curve A and the target shape to an arm operation control system.

In other words, since the pushing forces of a plurality of bending arms 106 are affected mutually, the feedback control diverges and thus there is a limit to improve the lapping precision.

Therefore, in the present embodiment, the pushing-down amount or the pulling-up amount of the work is controlled with high precision by a method described in the following.

First, a structure of the lapping jig used in the present embodiment will be explained hereunder. This lapping jig is fitted to the jig fitting surface 25a of the lapping adaptor 25 of the lapping machine shown in FIG. 5. However, the jig fitting surface 25a used in the present embodiment employs the structure that does not have the heating elements 29 thereon.

Figure 21:
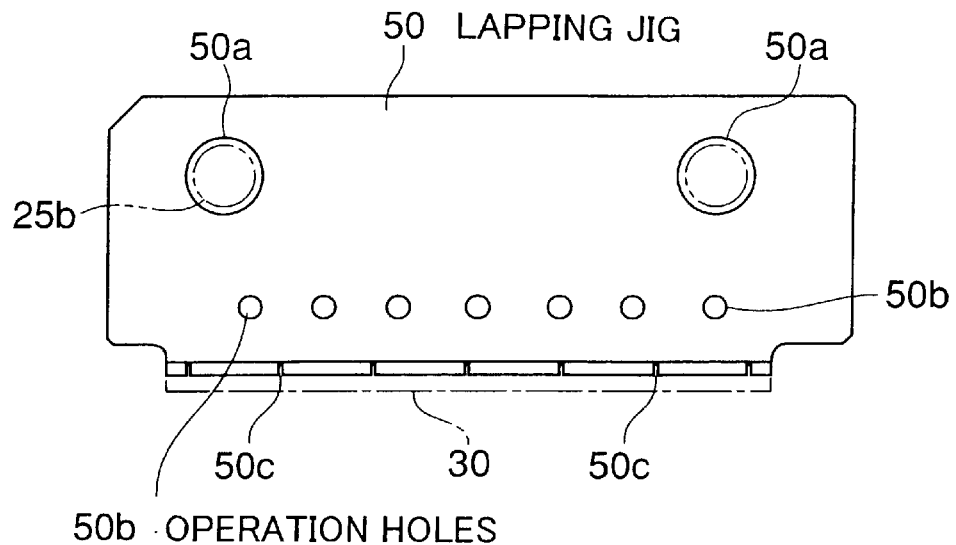
FIG. 21 is a front view showing a lapping jig used in a second embodiment of the present invention.

FIG. 21 is a front view of a lapping jig 50 used in the present embodiment. Positioning holes 50a are formed in an upper portion of the lapping jig 50, and also a plurality (e.g., three or more) of operation holes 50b, that are used to push down and pull up a bottom surface, are formed in a lower portion of the lapping jig 50 in parallel with the bottom surface thereof. Grooves 50c that make the curvature of the bottom surface easy are formed on the bottom surface of the lapping jig 50.

Figure 22:
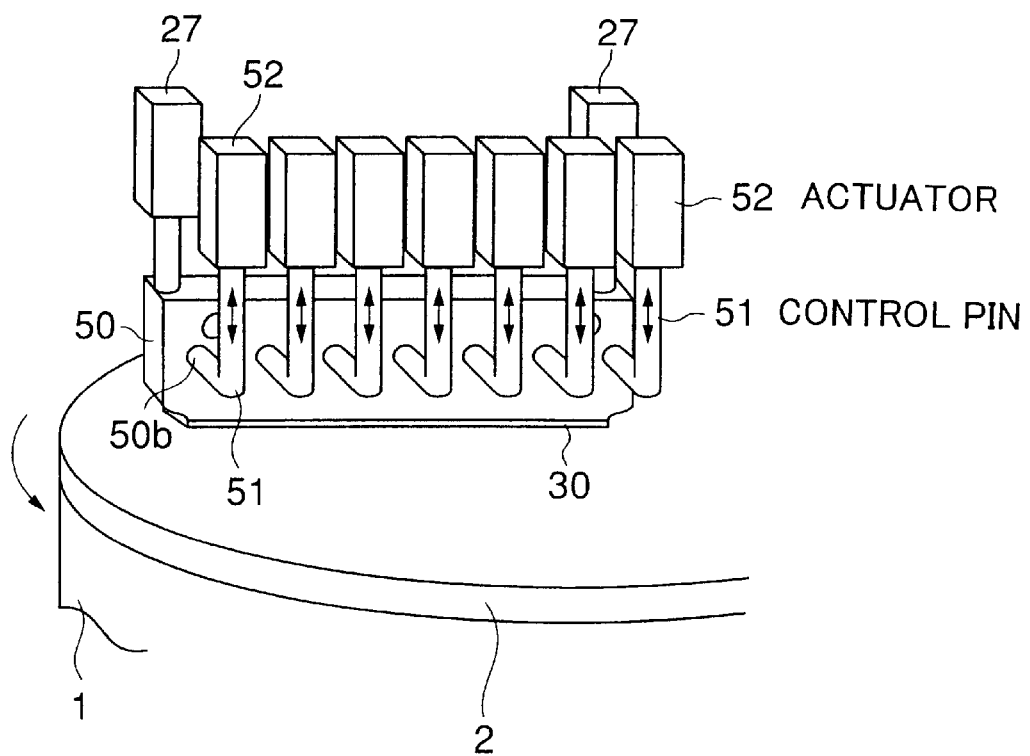
FIG. 22 is a perspective view showing a used state of the lapping jig used in the second embodiment of the present invention.

Also, as shown in FIG. 22, lower end portions of L-shaped control pins 51 are inserted into a plurality of operation holes 50b of the lapping jig 50, and actuators 52 are operated via the control pins 51 to push down or pull up the operation holes 50b. The operation holes 50b into which the control pins 51 are inserted act as operation points to which forces of the actuators 52 are applied.

Figure 23:
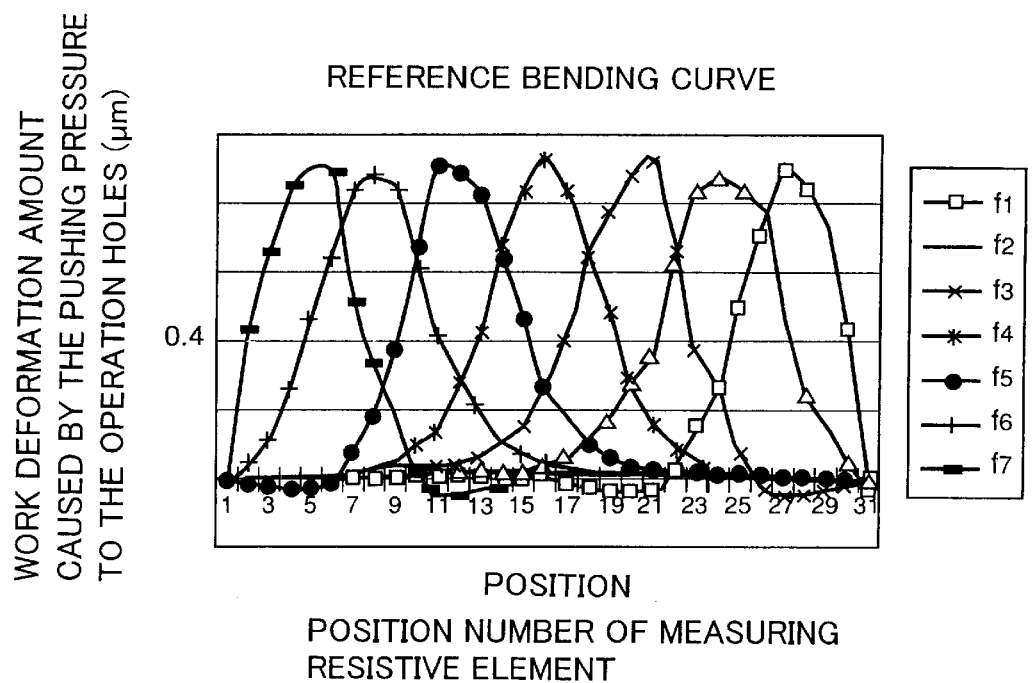
FIG. 23 is a view showing reference bending curves indicating a distribution of deformation amounts of the work when predetermined forces are applied separately to a plurality of operation holes of the lapping jig used in the second embodiment of the present invention.

For example, assume that seven operation holes 50a are provided to the lapping jig 50 and also 31 pairs of magnetic heads and monitoring resistive elements are formed on the bar-like work 30 that is fitted to the bottom surface of the lapping jig 50, if the operation holes 50b are pushed down one by one by the control pins 51 by applying a predetermined unit force Fu separately, amounts of the deformation of the work are shown like the curves $f_1$ to $f_7$ in FIG. 23.

According to seven curves shown in FIG. 23, it is understood that, when one operation hole 50b of the lapping jig 50 is pushed down toward the lapping surface plate 1, the pushing force is applied to the operation point and its periphery to have a peak at the operation point. The curves shown in FIG. 23 are called "reference bending curves" hereinafter. In FIG. 23, the measurement was carried out under the premises that an equal force is applied to each operation point and no camber is generated in the work 30.

After the reference bending curves at lower positions of the operation holes 50a of the lapping jig 50 are examined as descried above, a current profile of the curve that connects the top ends of a plurality of magnetic heads on the work 30 before the lapping are examined. The current shape curve obtained before the start of the lapping is called an "initial shape curve" hereinafter, and is indicated by a solid line in FIG. 24, for example.

Figure 24:
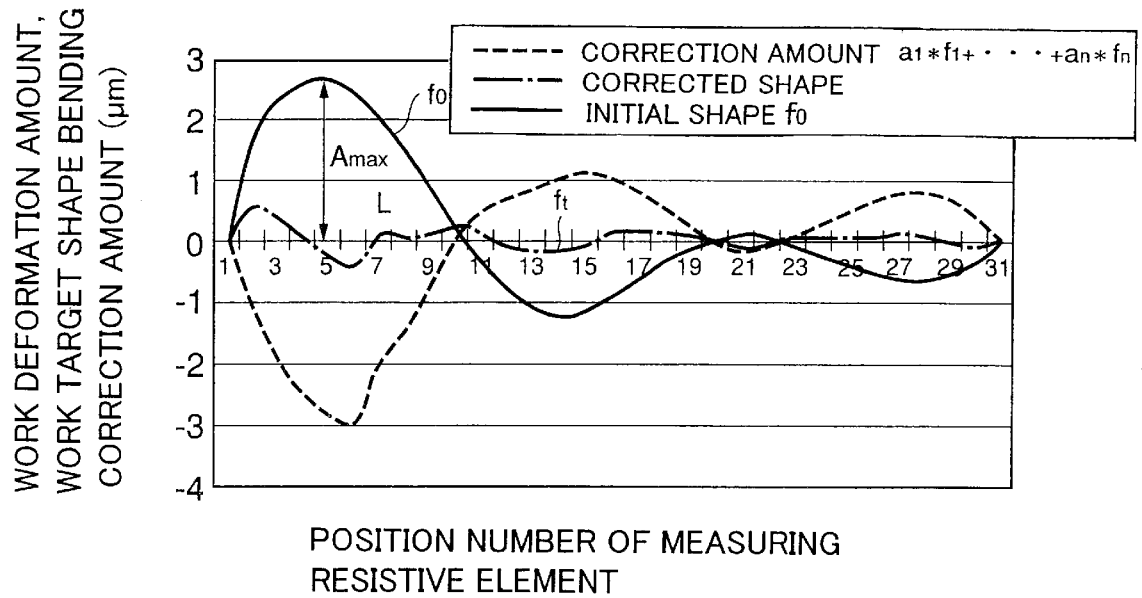
FIG. 24 is a view showing an initial shape, a correction amount distribution, and a corrected shape of the work whose shape is corrected by the present invention.

A correction amount distribution curve indicated by a broken line in FIG. 24 is calculated by adjusting the magnitudes of a plurality of reference bending curves shown in FIG. 23 and then superposing a plurality of adjusted reference bending curves.

In the adjustment of the reference bending curves, in the case of the pushing-down amount, the reference bending curves are increased by $\beta$ times in the positive direction and, in the case of the pulling-up amount, the reference bending curves are increased by $\beta$ times in the negative direction.

Where β is called an optimization ratio.

The correction amount distribution curve is expressed by a curve that is obtained by subtracting the current shape curve (the initial shape curve $f_o$) from a target shape line $f_t$.

Next, if the operation holes 50b are pushed down and pulled up via a plurality of control pins 51 by operating the actuators 52 shown in FIG. 22, the curve obtained by connecting the top ends of a plurality of magnetic heads of the lapping jig 50 can be adjusted into a bending corrected shape curve indicated by a dot-dash line in FIG. 24.

Then, the lapping is started by bringing the work 30 into contact with the lapping machine (lapping surface) 2 of the lapping surface plate 1 shown in FIG. 5.

In the meanwhile, assume that a function of the target shape line of the work 30 indicated by a dot-dash line in FIG. 24 is set to $f_t$, a function of the current shape of the work 30 that is calculated based on the resistance values of the monitoring resistive elements 33 on the work 30 is set to $f_o$, functions of a plurality of reference bending curves as shown in FIG. 23 are set to $f_1, f_2, \ldots f_n$ respectively, and the optimization ratios β of the control pins 51 by a plurality of actuators 52 are set as $\alpha_1, \alpha_2, \ldots, \alpha_n$ respectively, then $a_1, a_2, \ldots, a_n$, can be decided by the method using the multiple regression analysis. In other words, this means that, if corrected curves are subtracted from the initial shape, the target shape can be obtained.

Here, assume that a following equation (1) can be satisfied.

$$f_t = f_0 - a_1{}^*f_1 - a_2{}^*f_2 - a_3{}^*f_3 - \ldots - a_n{}^*f_n \quad (1)$$

However, actually there exist a difference between the target shape line on the left side of Eq.(1) and the work corrected shape line on the right side. A function $f_e$ of the difference can be expressed by a following equation (2).

$$f_e = f_0 - f_t - a_1{}^*f_1 - a_2{}^*f_2 - a_3{}^*f_3 - \ldots - a_n{}^*f_n \quad (2)$$

Then, in order to calculate $a_1, a_2, \ldots, a_n$ that can minimize $f_e$, the evaluation function to "minimize the sum of squares of $f_e$", for example, is employed.

The evaluation function is a function in which results obtained by differentiating the sum of squares of $f_e$ by $a_1, a_2, \ldots, a_n$ are set to zero. Following equations (3) can be derived by putting these results together.

$$\Sigma(f_1{}^*f_1)a_1 + \Sigma(f_1{}^*f_2)a_2 + \ldots + \Sigma(f_1{}^*f_n)a_n = \Sigma((f_0 - f_t){}^*f_1)$$

$$\Sigma(f_2{}^*f_1)a_1 + \Sigma(f_2{}^*f_2)a_2 + \ldots + \Sigma(f_2{}^*f_n)a_n = \Sigma((f_0 - f_t){}^*f_2)$$

$$\ldots$$

$$\Sigma(f_n{}^*f_1)a_1 + \Sigma(f_n{}^*f_2)a_2 + \ldots + \Sigma(f_n{}^*f_n)a_n = \Sigma((f_0 - f_t){}^*f_n) \quad (3)$$

The values of $a_1, a_2, \ldots, a_n$ are calculated by solving the n simultaneous equations in Eq. (3). Then, the n control pins 51 are moved upwardly or downwardly in response to the operation amounts of $a_1$ Fu, $a_2$ Fu, ..., $a_n$ Fu of the n actuators 52.

As a result, the curve connecting the top ends of a plurality of monitoring resistive elements 33 and the magnetic heads 32 on the work 30 can coincide with the target shape curve or can be positioned most approximate to the target shape curve.

Figure 25:
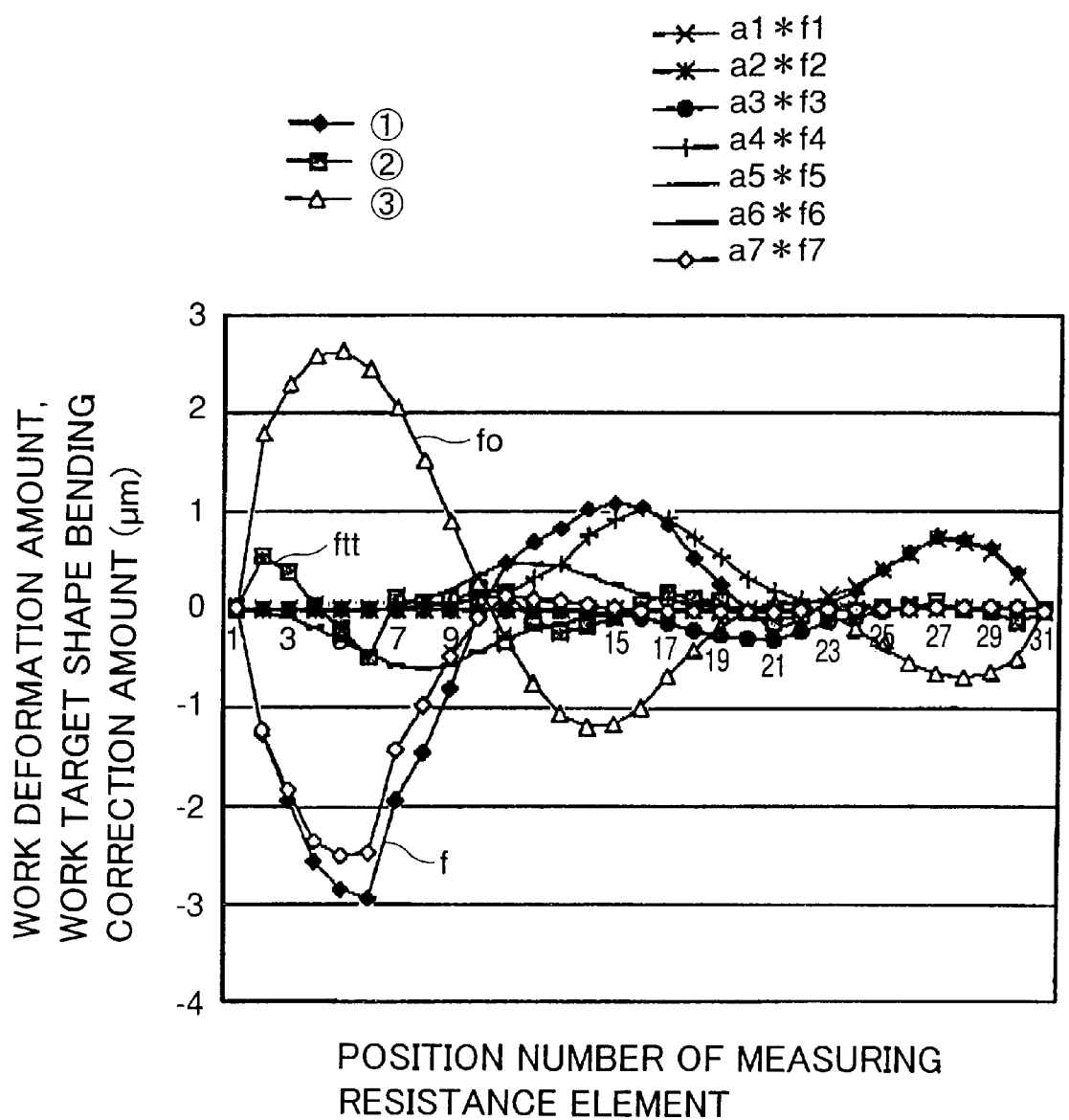
FIG. 25 is a view showing curves indicating the initial shape, the correction amount distribution, and the corrected shape of the work that is corrected by using the lapping jig used in the second embodiment of the present invention, and curves indicating individual correct amount distributions obtained by the forces that are applied individually to a plurality of operation points of the lapping jig.

A plurality of curves shown in FIG. 25 indicate individual correction amount distribution curves at respective operation points derived by multiplying the reference bending curves $f_1, f_2, \ldots, f_7$ shown in FIG. 23 by lapping coefficients $a_1, a_2, \ldots, a_7$ respectively, corrected distribution curves $a_1 f_1 + a_2 f_2 + \ldots + a_7 f_7$ obtained by overlapping these individual correct amount distribution curves, the initial shape curve $f_0$, and the corrected shape curve $f_{tt}$.

Figure 26:
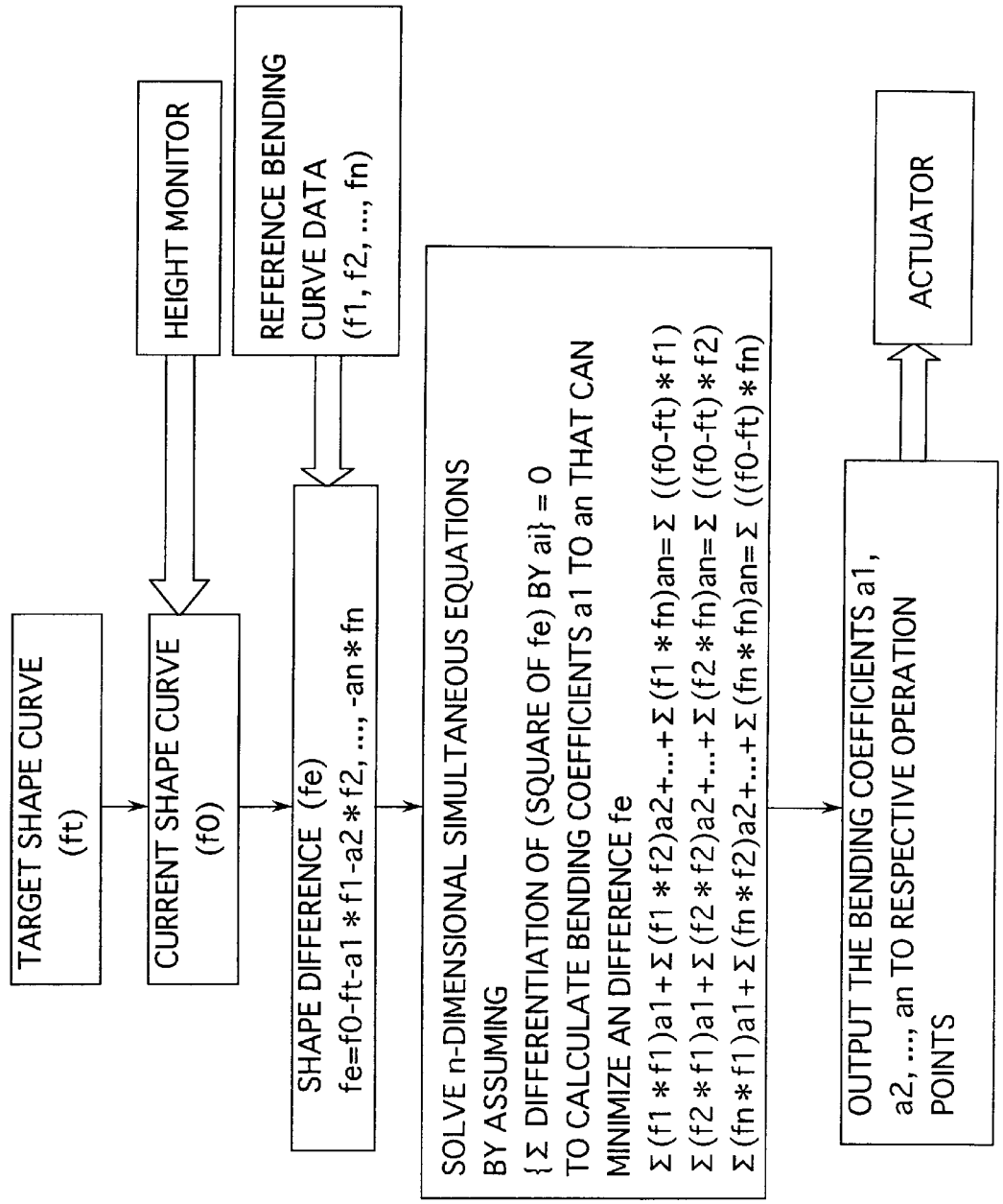
FIG. 26 is a flowchart of a work shape correcting method according to a target shape generating method of the second embodiment of the present invention.

A series of processes described above can be expressed by a flowchart shown in FIG. 26. Such processes are called a "target shape generating method" hereinafter.

Then, a method of lapping the work with higher precision by using the target shape generating method.

In order to execute the lapping, the lapping jig 50, the actuators 25, and the control pins 51 shown in FIG. 22 are employed in addition to the structure shown in FIG. 5.

Figure 27:
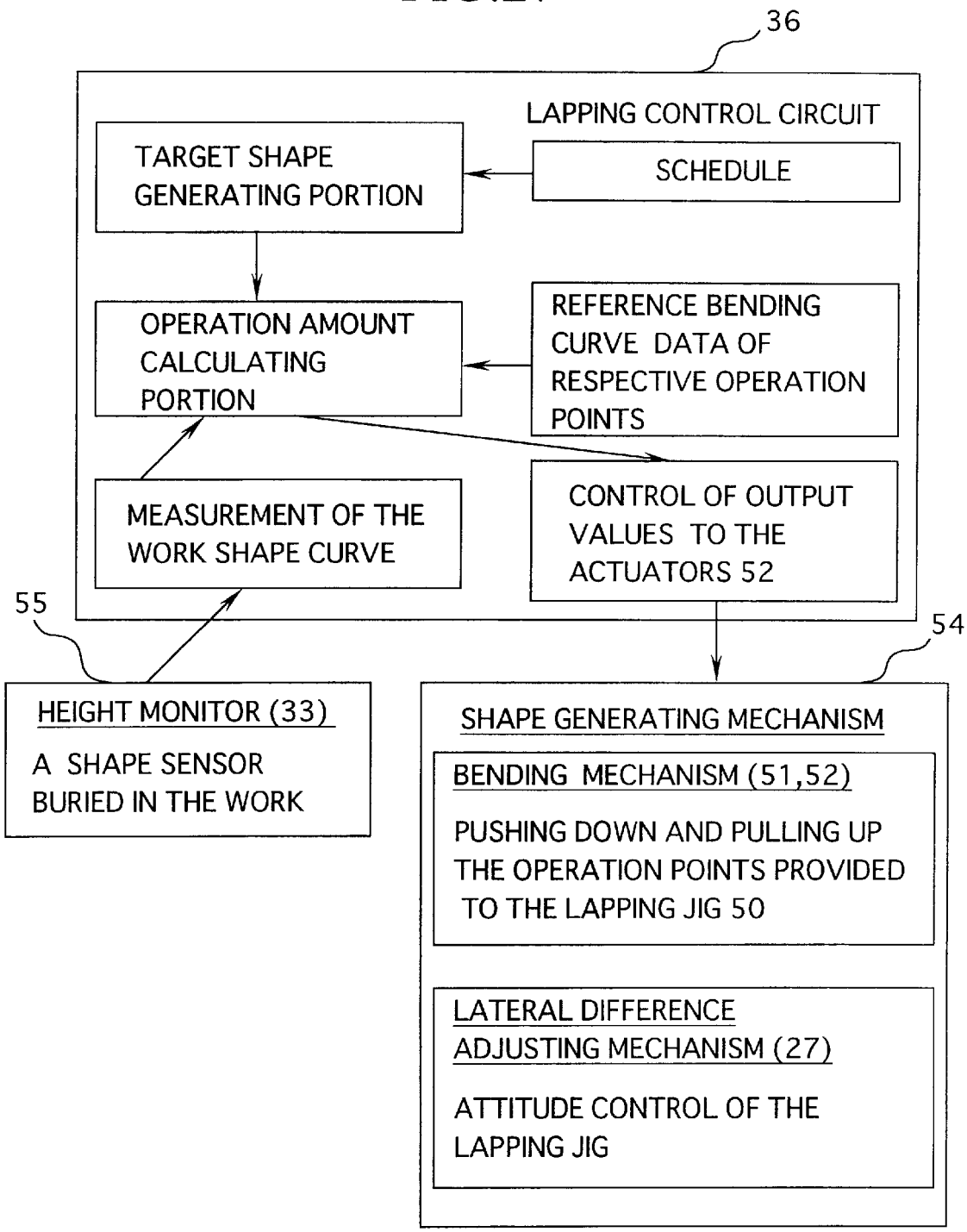
FIG. 27 is a block diagram of a control system of a lapping machine to correct a work shape of the second embodiment of the present invention.

A block diagram about the work shape correction is shown in FIG. 27. The structure comprises a shape generating mechanism 54 for deforming the work 30 into any shape, a height monitor 55 for measuring the shape of the work, and the lapping control circuit 36 for outputting the correction amounts to the shape generating mechanism 54.

As the height monitor 55, the monitoring resistive elements 33 on the work 30 shown in FIG. 7 are employed. The resistance values and the heights of the monitoring resistive elements 33 have an inversely proportional relationship. When the height is reduced via the lapping, the resistance value is increased. The work 30 is fitted to the bottom surface of the lapping jig 50.

Also, as the shape generating mechanism 54, the lapping jig 50, the actuators 52, and the control pins 51 are employed.

Then, if all the resistance values of a plurality of monitoring resistive elements as the height monitor 55 are detected, the progress situation of the lapping of the work 30 and the camber of the work 30 can be monitored. The reference bending curves of respective actuators 52 in the state the work 30 is fitted to the lapping jig 50 are examined previously as shown in FIG. 23, and reference bending curve data are stored in the lapping control circuit 36.

If the magnetoresistive effect layer is contained in the magnetic head, such magnetoresistive effect layer may be employed as the height monitor 55.

When the lapping of the work is started, first an inclination of the shape of the work 30 before the lapping is detected based on the resistance values of the monitoring resistive elements 33. Then, the positions of two fixed points at right and left ends of the work 30 or other positions are adjusted by a lateral difference adjusting mechanism, and also the inclination of the lapping jig 50 is adjusted to position the bottom surface of the work 30 in parallel with the lapped surface of the lapping surface plate 1. As the lateral difference adjusting mechanism, right and left pressure machines 27 shown in FIG. 5, FIG. 22 are employed.

Figure 28:
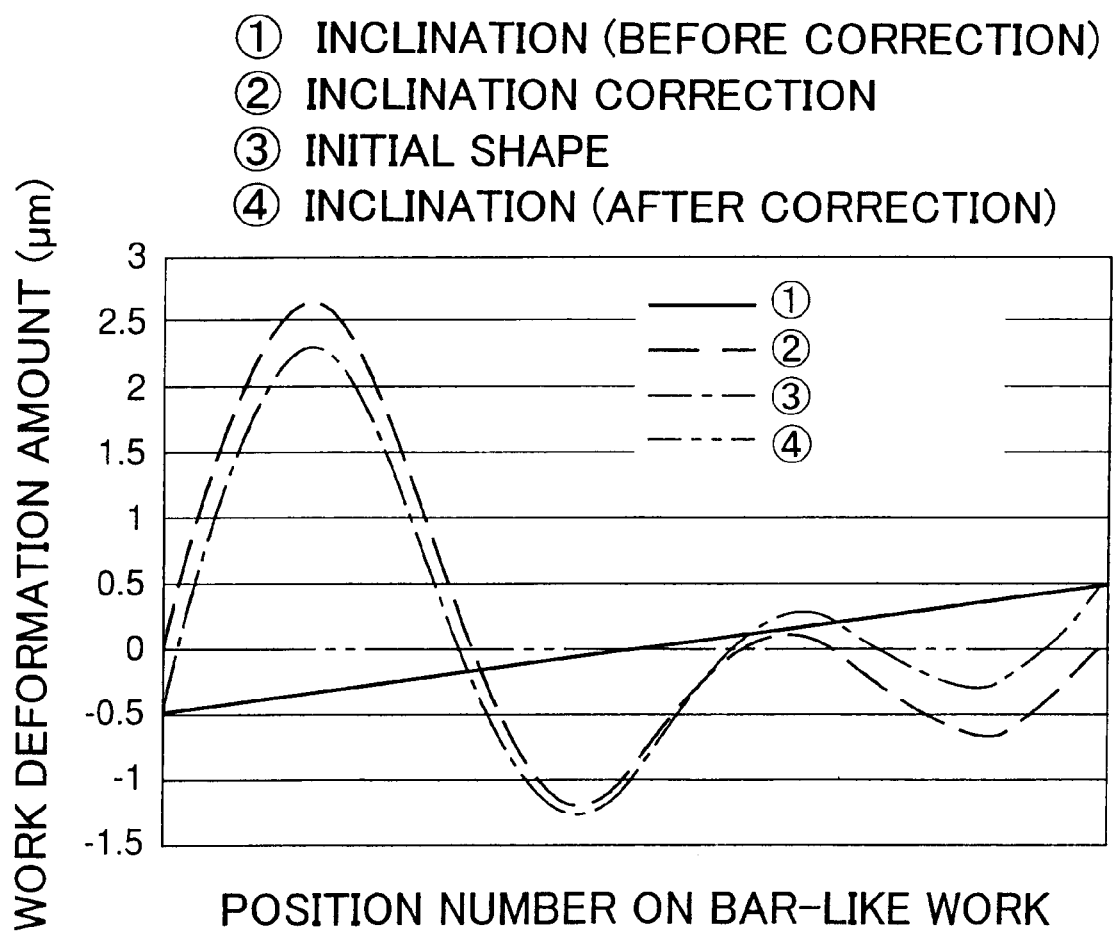
FIG. 28 is a view showing an initial shape curve of the work and inclinations of the work before and after the correction in the second embodiment of the present invention.

For example, if the shape of the work 30 prior to the lapping is given by a curve indicated by a dot-dash line in FIG. 28, the inclination of the work 30 is shown as indicated by a solid line in FIG. 28. If the inclination of the work 30 is corrected by the lateral difference adjusting mechanism 27, the shape of the work 30 is given by a curve indicated by a dot-dash line in FIG. 28 and the inclination of the work 30 is indicated by a chain double-dashed line in FIG. 27. The shape of the work 30 corrected by the lateral difference adjusting mechanism 27 is set as the initial shape.

In addition, the scheduling of the lapping of the work 30 is carried out by a method described in the following.

In the scheduling, in the position at which a maximum deviation Amax between the target shape ft and the current shape (initial shape) $f_0$ in FIG. 24 is present, a time that is required from the start of lapping of the work 30 to the end of lapping at a lapping speed v (μm/min) is set to Tmax.

Then, a sampling time of the lapping (lapping control period) is set to t, and the number d of lapping steps is set to d=Tmax/t.

Accordingly, a shape function $fk_t$ of the work 30 at respective lapping points at the sampling time in the k-th (k is a natural number, k>1) step of the number d of lapping steps can be expressed by a following equation (4).

$$fk_t = fi - S_{a1} \cdot k/d \cdot f_1 - S_{a2} \cdot k/d \cdot f_2 - \ldots - S_{an} \cdot k/d \cdot f_n \qquad (4)$$

Where fi is a function that indicates the current shape curve or the initial shape curve of the work, and $S_{a1}$, $S_{a2}$, $S_{an}$ are coefficients used to correct initial states at the operation points calculated by the above target shape generating method into the target shape respectively. The target shape curves are different every lapping step and thus the d target shape curves are present. Thus, the k=d-th target shape curve becomes the final target shape curve ff.

In addition, a factor for forecasting the lapped results by taking a peculiar characteristic of the lapping surface 2 of the lapping surface plate 1 into consideration may be added to the function $fk_t$ of the target shape curve.

During the lapping of the work 30, the target shape generating method is carried out by calculating the function $fk_t$ of the target shape in the k-th step every sampling time.

According to the target shape generating method, actually there exist an difference $fk_e$ between the function $fk_t$ of the target shape curve in the k-th step and the function fi of the current shape curve. The difference function $fk_e$ can be given by a following equation (5).

$$fk_e = fi - fk_t - a_1 * f_1 - a_2 * f_2 - \ldots - a_n * f_n \qquad (5)$$

Then, in order to calculate $a_1, a_2, \ldots a_n$ so as to minimize $fk_e$, the evaluation function for minimizing the sum of squares of $fk_e$ is used.

In the evaluation function, following equations (6) can be derived by setting the results that are obtained by differentiating the sum of squares of $f_e$ by $S_{a1}, S_{a2}, \ldots, S_{an}$ to zero, and then arranging them.

$$\Sigma(f_1 * f_1)a_1 + \Sigma(f_1 * f_2)a_2 + \ldots + \Sigma(f_1 * f_n)a_n = \Sigma((f_0 - f_t) * f_1)$$

$$\Sigma(f_2 * f_1)a_1 + \Sigma(f_2 * f_2)a_2 + \ldots + (f_2 * f_n)a_n = \Sigma((f_0 - f_t) * f_2)$$

$$\ldots$$

$$\Sigma(f_n * f_1)a_1 + \Sigma(f_n * f_2)a_2 + \ldots + \Sigma(f_n * f_n)a_n = \Sigma((f_0 - f_t) * f_n) \qquad (6)$$

Then, if operation amounts corresponding to $a_1, a_2, \ldots, a_n$ derived by solving the n simultaneous equations in such Eq.(6) are applied to the actuators 52 on the lapping jig 50, the work 30 is deformed and is lapped from the current shape curve to the k-th target shape curve.

Figure 29:
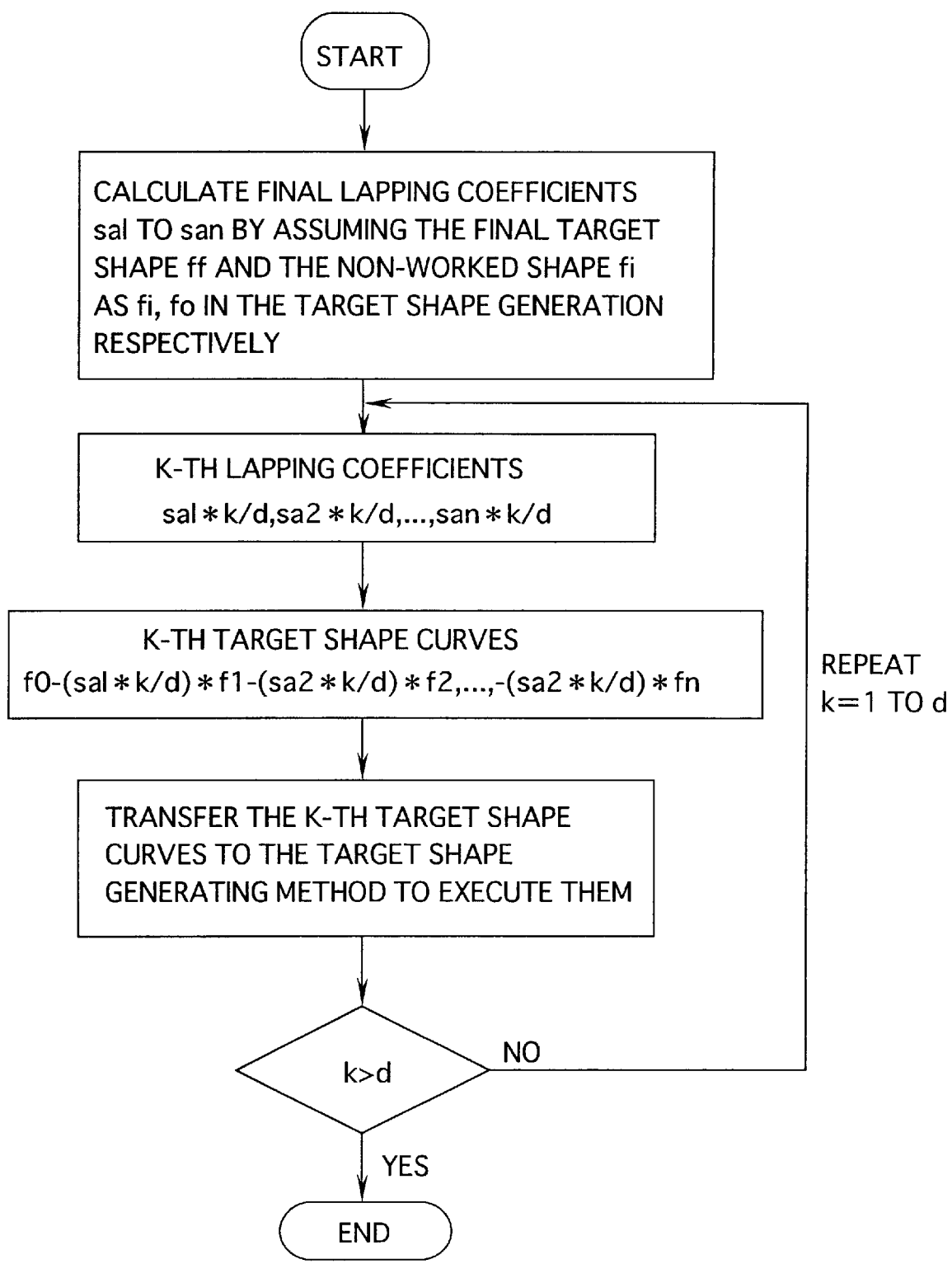
FIG. 29 is a flowchart showing a work lapping method based on the target shape generating method according to the second embodiment of the present invention.

The lapping method of the work based on the above scheduling is called a "target shape following-up method", and is carried out in compliance with a flowchart shown in FIG. 29.

Figure 30:
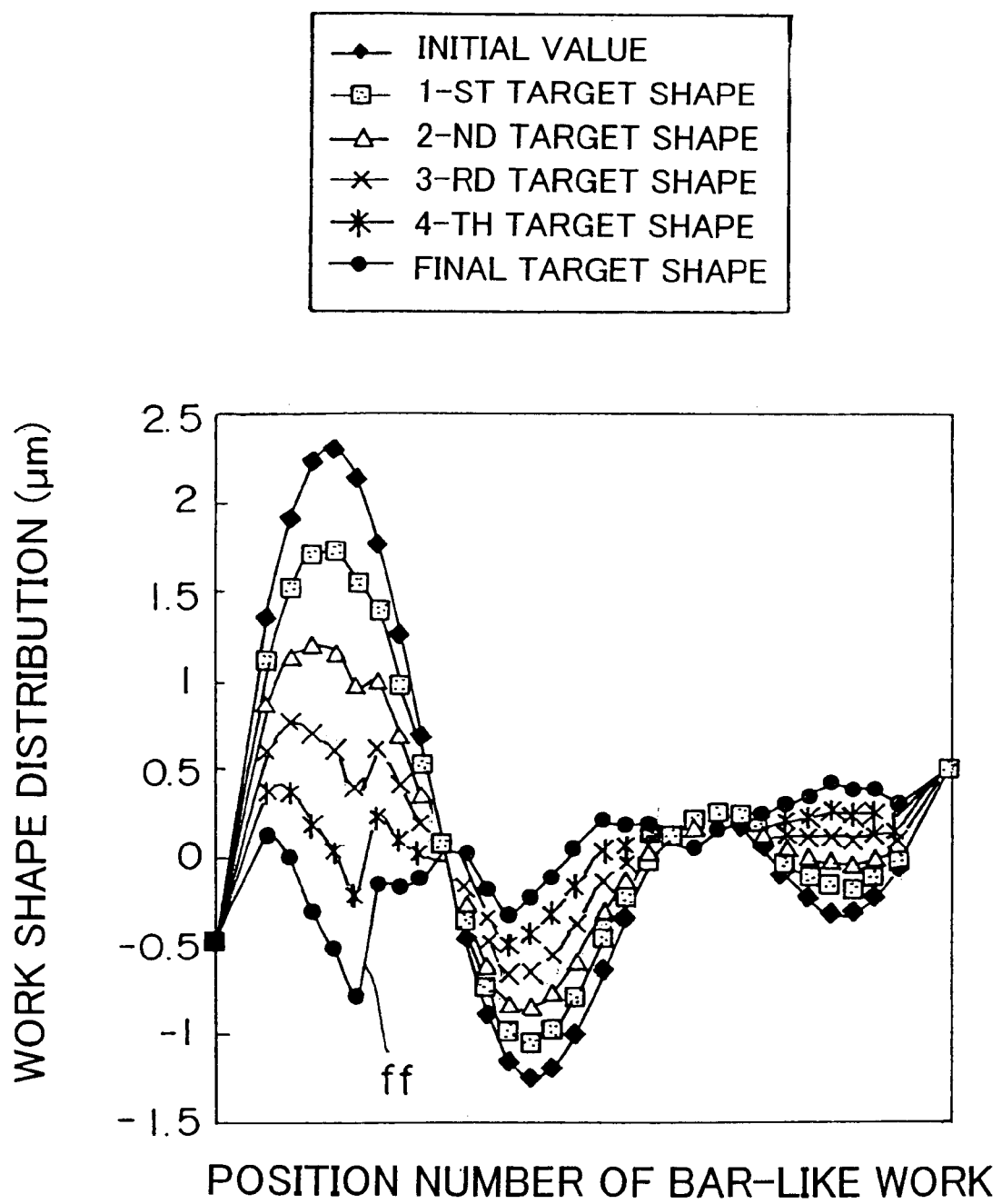
FIG. 30 is a view showing target shape curves of the work in a plurality of lapping steps according to the target shape following-up method of the second embodiment of the present invention.

If the above operations are executed in accordance with 1-st to d-th schedules, the lapped surface of the work 30 is changed into the shape shown in FIG. 30, and the final target shape ff can be obtained with high precision. In FIG. 30, an example in which d is set to d=5 is shown.

In the above example, the deformation to correct the shape difference that was measured once before the working is calculated, and then such deformation is applied gradually to the lapping jig. In addition, in order to improve the precision, the processing loops such as the shape measurement, the correction, the shape measurement, the correction, . . . , may be repeated.

(Third Embodiment)

In the above second embodiment, the positions of the operation holes 50b that are pushed down and pulled up by the actuators 52 via the control pins (pushing/pulling elements) 51 are fixed. If the number of the operation holes 50b and the actuators 52 is increased, it is possible to correct the shape of the work 30 with higher precision.

However, since the lapping jig 50 is small, it is not practical that a large number of actuators 52 are arranged in the narrow area.

Therefore, a structure in which the work 30 can be corrected with higher precision by changing the position of the lapping jig 50 that is pushed down and pulled up by the actuators 52 will be explained hereunder. In the present embodiment, the lapping machine shown in FIG. 5 is also used.

Figure 31A:
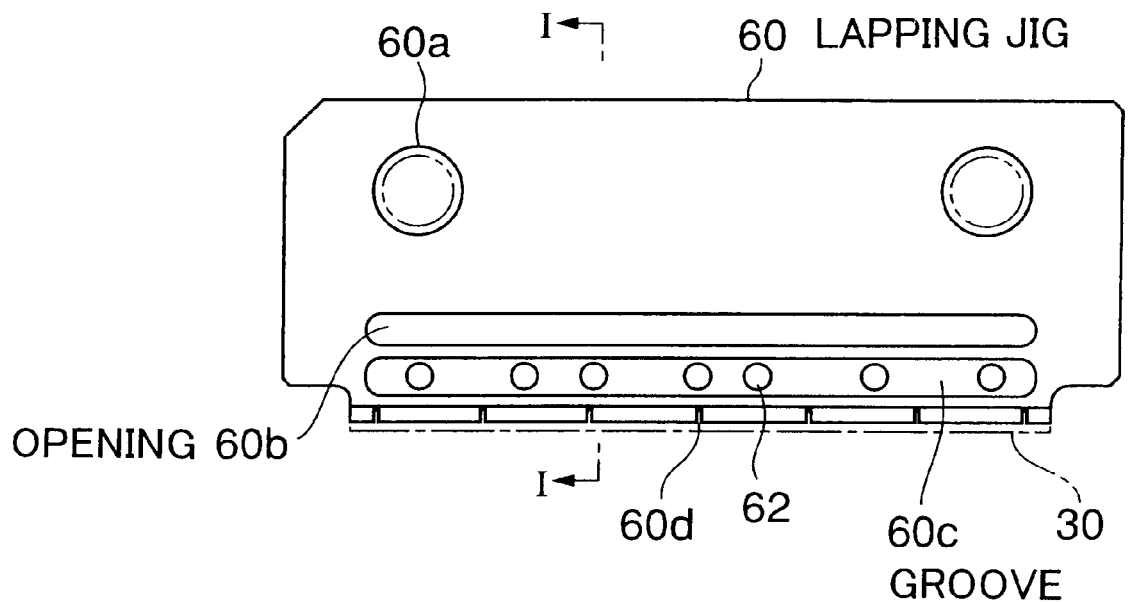
FIG. 31(a) is a front view showing a lapping jig used in a third embodiment of the present invention.
Figure 31B:
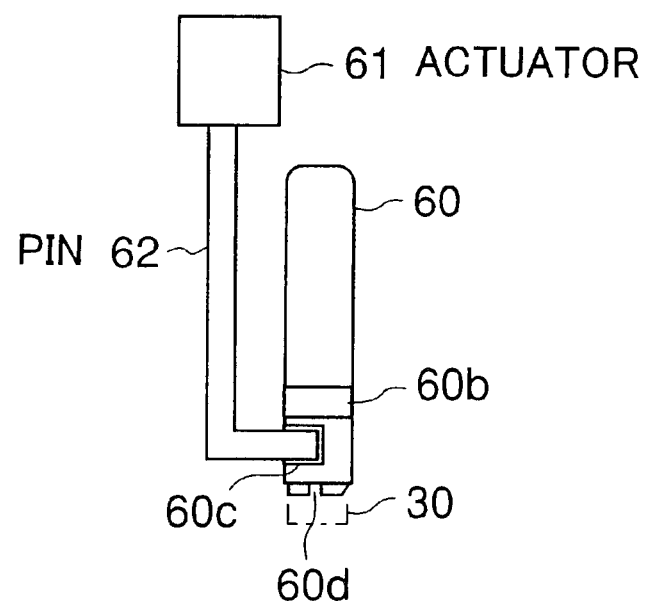
FIG. 31(b) is a sectional view showing the lapping jig viewed along a I—I line in FIG. 31(a)

FIG. 31(a) is a pla view showing a structure of a lapping jig 60 used in the present embodiment, and FIG. 31(b) a sectional view taken along a I—I line in FIG. 31(a).

In FIG. 31, like the first embodiment, positioning holes 60a into which the fixing pins 25b on the jig fitting surface 25a of the lapping adaptor 25 shown in FIG. 6 are inserted are formed in the flat-plate lapping jig 60. Also, a stripe-like opening 60b is formed in the front surface of the lapping jig 60 along the bottom surface. In addition, a stripe-like groove 60c is formed in the front surface of the lapping jig 60 on the lower side of the opening 60b in parallel with the bottom surface of the lapping jig 60.

Also, a plurality of actuators 61 are arranged movably along the longitudinal direction of the groove 60c of the lapping jig 60 over the jig fitting surface 25a of the lapping adaptor 25 shown in FIG. 5.

Also, one top ends of a plurality of L-shaped control pins 62 are fitted slidably into the groove 60c in a line, and the other top ends of the control pins 62 are fitted to driving portions of the actuators 61.

As the lapping adaptor 25, a structure which does not have the heating elements is employed. Also, a groove 60d that renders the bottom surface to curve easily is formed on the bottom surface of the lapping jig 60.

Then, if lateral positions of the actuators 61 are changed in the state that the lapping jig 60 is fitted to the jig fitting surface 25a of the lapping adaptor 25 shown in FIG. 6, one ends of the L-shaped control pins 62 can be set to positions shown in FIG. 31(a), for example.

Figure 32:
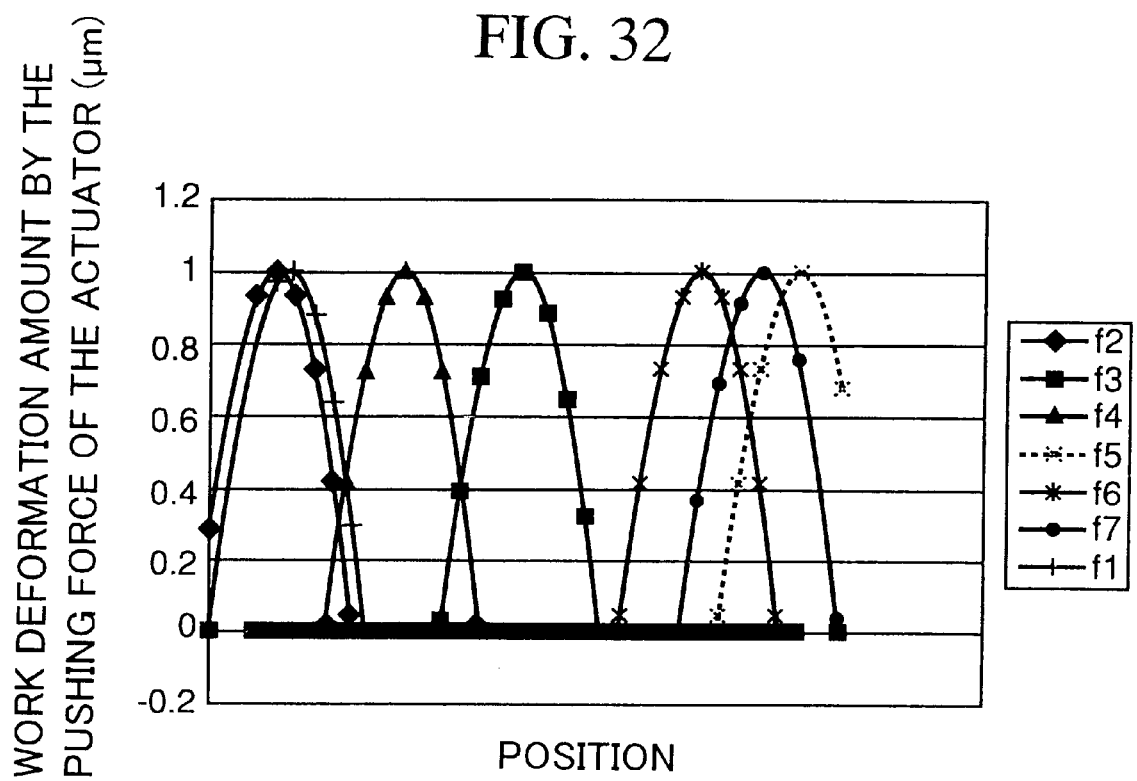
FIG. 32 is a view showing reference bending curves indicating a distribution of a deformation amount of the work when predetermined forces are applied separately to a plurality of operation holes, being set arbitrarily, of the lapping jig used in the third embodiment of the present invention.

As shown in FIG. 32, for example, the reference bending curves on the bottom surface of the lapping jig 60 by the pushing forces or the pulling forces of individual actuators 61 are indicated at the positions shown in FIG. 31(a).

The positions of the L-shaped control pins 62 are decided as follows.

Figure 33:
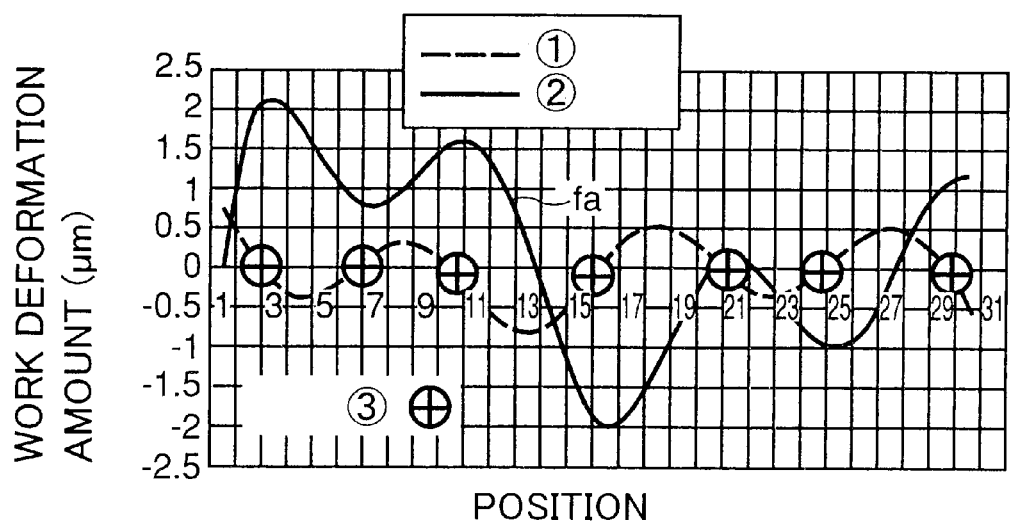
FIG. 33 is a view showing a shape curve of the work fitted to the lapping jig used in the third embodiment of the present invention and a first order differential curve.

First, a line obtained by connecting the top ends of a plurality of magnetic heads 32 and the monitoring resistive elements 33 that are formed on the work 30 is decided as the camber of the work. As a result, the curvature of the work 30 indicated by a solid line in FIG. 33, for example, is measured. In order to calculate an extremal value of the function $f_a$ of the curve, a differential curve indicated by a broken line in FIG. 33 is calculated by first-order differentiating the function $f_a$ of the curve. Then, the position at which the differential curve intersects with the zero axis provides a peak value of the function $f_a$.

Then, the operation points are assigned to respective peaks of the function $f_a$ in order of such a peak that has a larger displacement amount from the zero axis. Further, the actuators 61 and the control pins 62 are moved such that one ends of the control pins 62 can coincide with the assigned operation points.

After this, the control pins 62 are pushed down and pulled up by the actuators 61 such that the camber of the work 30 becomes the target shape or approximate to the target shape according to the predetermined method.

The adjustment of the lower positions of the control pins 62 may be performed by the "target shape generating method" explained in the second embodiment, or may be decided by the method in the prior art.

If the "target shape generating method" is employed, the distance between the final target curve and the initial shape curve is divided into d segments. In this case, the locations being pulled down or pushed up by the actuators 61 may be adjusted by moving the lateral position of the control pin 62, i.e., the operation point, every resultant divided segment.

Figure 34:
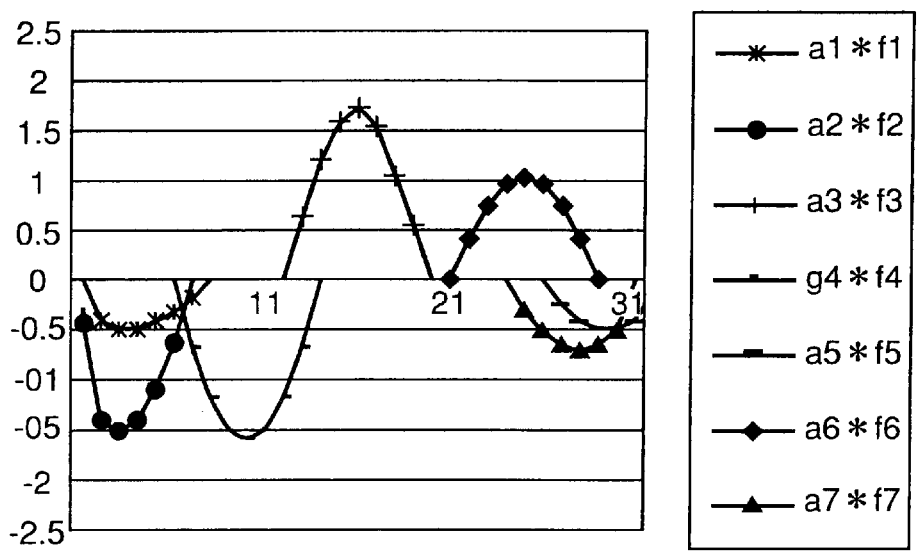
FIG. 34 is a view showing individual correcting curves based on the forces applied to respective operation points to correct the shape of the work after the operation points are aligned to the peaks of the shape curve of the work shown in FIG. 33.
Figure 35:
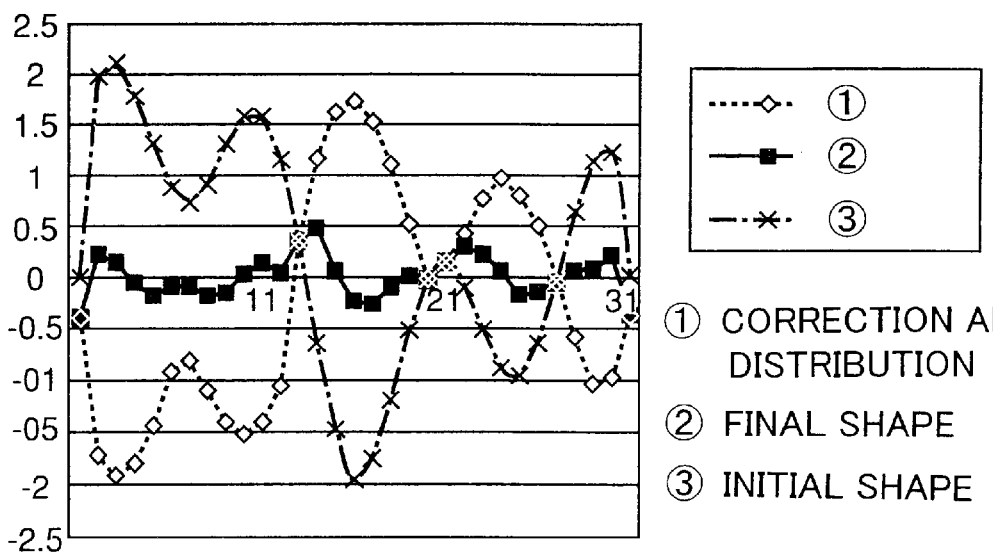
FIG. 35 is a view showing an initial shape and a final corrected shape of the work to be corrected and a correction amount distribution curve applied to the work in the third embodiment of the present invention.

For example, if seven actuators 61 and seven control pins 62 are employed, the pushing force and the pulling force of the control pins 62 calculated by the target shape generating method can be given as shown in FIG. 34. Their synthesized force is indicated by a broken line in FIG. 35. Then, a shape obtained after the initial shape of the work 30 indicated by a chain double-dashed line in FIG. 35 is corrected by the actuators becomes a shape as indicated by a solid line in FIG. 35.

The method of varying the operation points by moving the actuators, like the present embodiment, is called an "operation point sliding system".

What is claimed is:

1. A lapping machine comprising:

a lapping surface plate rotated by a rotating mechanism;

a lapping jig formed of a plurality of projections;

adjusting elements for adjusting the height of said projections respectively; and a control circuit for controlling said adjusting elements in response to the amount a work has been lapped, wherein after said work is fitted to said lapping jig, said work is lapped by adjusting the height of said projections.

2. A lapping machine according to claim 1, wherein said adjusting elements are heating elements which heat and carry out thermal expansion of said projections respectively.

3. A lapping machine according to claim 1, wherein said adjusting elements have actuators which push said projections respectively.

4. A lapping machine according to claim 1, wherein said work has a plurality of resistive elements which resistance changes in response to the amount of said resistive element lapped.

5. A lapping method, by which a work is lapped by a lapping machine which consists of a lapping surface plate rotated by a rotating mechanism and a lapping jig formed of a plurality of projections, comprising the steps of:

fining a work to said lapping jig; and adjusting the height of said projections respectively in response to the amount of said work lapped, while lapping said work between said lapping surface plate and said lapping jig.

6. A lapping method according to claim 5, wherein after said work is fitted to said lapping jig, said work is separated between said projections, after which said work is lapped.

7. A lapping method according to claim 5, wherein said work has a plurality of resistive elements which resistance changes in response to the amount said resistive elements are lapped.

8. A manufacturing method of magnetic heads, which uses a lapping machine which consists of a lapping surface plate rotated by a rotating mechanism and a lapping jig formed of a plurality of projections, comprising:

a step of forming a work on which a plurality of magnetic heads are aligned;

a step of fitting said work to said lapping jig; and a step of adjusting the height of said projections respectively in response to the amount of said work lapped, while lapping said work between said lapping surface plate and said lapping jig.

9. A manufacturing method of magnetic heads according to claim 8, wherein after said work is fitted to said lapping jig said work is separated between said projections, after which said work is lapped.

10. A manufacturing method of magnetic heads according to claim 8, wherein the height of said projections is adjusted by heating and carrying out the thermal expansion said projections respectively by heating elements.

11. A manufacturing method of magnetic heads according to claim 8, wherein the height of said projections is adjusted by pushing said projections respectively by actuators.

12. A manufacturing method of magnetic heads according to claim 8, wherein said work has a plurality of resistive elements which resistance changes in response to the amount said resistive element has been lapped, with said plurality of magnetic heads.

13. A manufacturing method of magnetic heads according to claim 12, wherein said resistive elements consist of magneto-resistive effect elements.

* * * * *